United States Patent
Devarajan

(10) Patent No.: US 11,671,438 B2
(45) Date of Patent: Jun. 6, 2023

(54) DETECTION OF LATENCY, PACKET DROPS, AND NETWORK HOPS THROUGH A TUNNEL BY TRACING HOPS THEREIN

(71) Applicant: Zscaler, Inc., San Jose, CA (US)

(72) Inventor: Srikanth Devarajan, Cupertino, CA (US)

(73) Assignee: Zscaler, Inc., San Jose, CA (US)

( * ) Notice: Subject to any disclaimer, the term of this patent is extended or adjusted under 35 U.S.C. 154(b) by 172 days.

(21) Appl. No.: 17/149,060

(22) Filed: Jan. 14, 2021

(65) Prior Publication Data
US 2022/0224703 A1 Jul. 14, 2022

(51) Int. Cl.
| | |
|---|---|
| H04L 43/10 | (2022.01) |
| H04L 45/00 | (2022.01) |
| H04L 43/04 | (2022.01) |
| H04L 43/00 | (2022.01) |
| H04L 47/00 | (2022.01) |
| H04L 9/40 | (2022.01) |
| H04L 47/28 | (2022.01) |
| H04L 43/12 | (2022.01) |
| H04L 43/08 | (2022.01) |
| H04L 67/10 | (2022.01) |

(52) U.S. Cl.
CPC .......... *H04L 63/1425* (2013.01); *H04L 43/08* (2013.01); *H04L 43/12* (2013.01); *H04L 45/20* (2013.01); *H04L 47/286* (2013.01); *H04L 63/0428* (2013.01); *H04L 63/1466* (2013.01); *H04L 67/10* (2013.01)

(58) Field of Classification Search
USPC .......................................................... 726/23
See application file for complete search history.

(56) References Cited

U.S. PATENT DOCUMENTS

| | | |
|---|---|---|
| 8,464,335 B1 | 6/2013 | Sinha et al. |
| 8,495,737 B2 | 7/2013 | Sinha et al. |
| 8,955,091 B2 | 2/2015 | Kailash et al. |
| 9,060,239 B1 | 6/2015 | Sinha et al. |
| 9,369,433 B1 | 6/2016 | Paul et al. |
| 9,473,537 B2 | 10/2016 | Sinha et al. |
| 9,800,517 B1 * | 10/2017 | Anderson ............... H04L 67/10 |
| 10,728,113 B2 | 7/2020 | Sinha et al. |
| 10,728,117 B1 | 7/2020 | Sharma et al. |
| 2005/0276388 A1 * | 12/2005 | Ethier .................... H04L 43/00 379/32.01 |
| 2009/0113070 A1 * | 4/2009 | Mehta ................. H04L 43/0811 709/238 |
| 2011/0277027 A1 | 11/2011 | Hayton et al. |
| 2012/0304244 A1 | 11/2012 | Xie et al. |
| 2013/0311832 A1 | 11/2013 | Lad et al. |

(Continued)

*Primary Examiner* — Jude Jean Gilles
(74) *Attorney, Agent, or Firm* — Baratta Law PLLC; Lawrence A. Baratta, Jr.; Ryan Odessa

(57) ABSTRACT

Techniques for using traceroute with tunnels and cloud-based systems for determining measures of network performance are presented. Systems and methods include receiving a request, from a client, for a trace of the tunnel; causing the trace inside the tunnel; obtaining results of the trace inside the tunnel; and sending the results of the trace inside the tunnel to the client so that the client aggregates these details with details from one or more additional legs to provide an overall view of a service path between the client and a destination.

20 Claims, 21 Drawing Sheets

(56) References Cited

U.S. PATENT DOCUMENTS

| | | |
|---|---|---|
| 2013/0322258 A1* | 12/2013 | Nedeltchev ............. H04L 47/00 370/241 |
| 2014/0321315 A1* | 10/2014 | Akhter ................ H04L 43/0894 370/253 |
| 2015/0195291 A1 | 7/2015 | Zuk et al. |
| 2015/0326613 A1 | 11/2015 | Devarajan et al. |
| 2017/0078175 A1* | 3/2017 | Xu .......................... H04L 45/26 |
| 2017/0210731 A1 | 7/2017 | Kumar et al. |
| 2017/0250887 A1 | 8/2017 | Sadana et al. |
| 2017/0315902 A1 | 11/2017 | Moretto et al. |
| 2017/0366421 A1 | 12/2017 | Dam et al. |
| 2020/0274782 A1 | 8/2020 | Balaiah et al. |
| 2020/0274783 A1 | 8/2020 | Sharma et al. |
| 2020/0274784 A1 | 8/2020 | Sharma et al. |

* cited by examiner

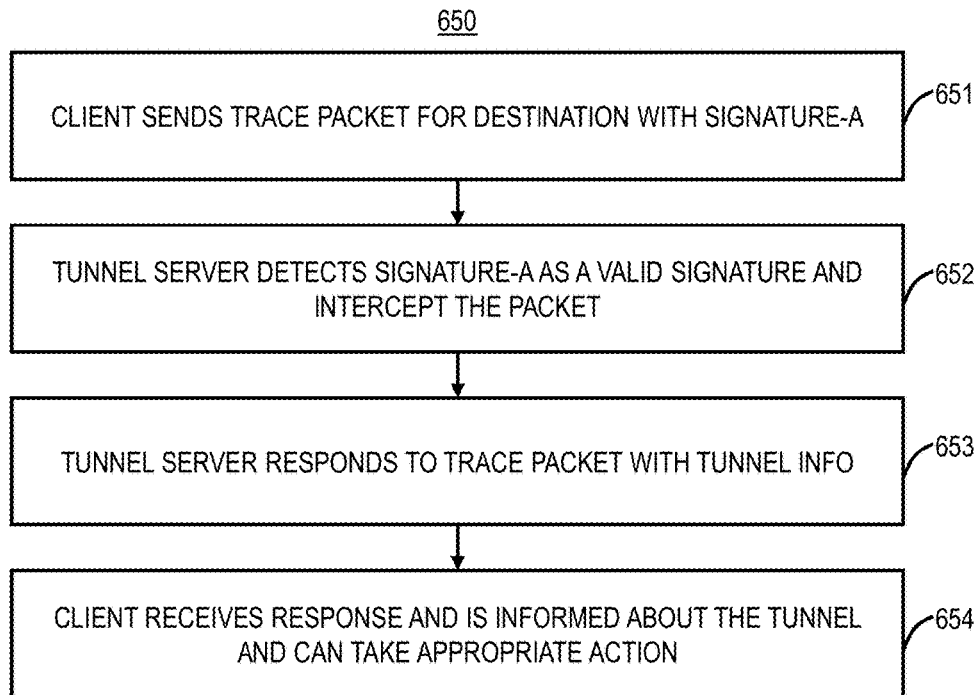

INDEX        CURRENT        END
                 ↓             ↓            ↓
  602-1   602-1   602-2        602-3        602-4

[141,-1,-1,-1,-1] [-1,-1,-1,-1,-1] [14, 14, 14, 15, 13] [15, 5, 20, 15, 20] [-1, 7, 27, 17, 17]

AVG = 141              AVG = 14     AVG = 15       AVG = 17

ADJ AVG = 141          ADJ AVG = 14  ADJ AVG = 15   ADJ AVG = 17

DIFF AVG = 14          DIFF AVG = 0  DIFF AVG = 1   DIFF AVG = 17

FIG. 33

CURRENT
                              INDEX        END
                                ↓           ↓
  602-1   602-1   602-2        602-3        602-4

[141,-1,-1,-1,-1] [-1,-1,-1,-1,-1] [14, 14, 14, 15, 13] [15, 5, 20, 15, 20] [-1, 7, 27, 17, 17]

AVG = 141              AVG = 14     AVG = 15       AVG = 17

ADJ AVG = 14           ADJ AVG = 14  ADJ AVG = 15   ADJ AVG = 17

DIFF AVG = 14          DIFF AVG = 0  DIFF AVG = 1   DIFF AVG = 2

FIG. 34

DETECTION OF LATENCY, PACKET DROPS, AND NETWORK HOPS THROUGH A TUNNEL BY TRACING HOPS THEREIN

FIELD OF THE DISCLOSURE

The present disclosure relates generally to networking and computing. More particularly, the present disclosure relates to various techniques for using traceroute with tunnels and cloud-based systems for determining measures of network performance.

BACKGROUND OF THE DISCLOSURE

The trend in Information Technology (IT) includes applications and resources being located in the cloud, users working from home or anywhere, and for the Internet becoming the new corporate network. As such, there is a need for IT to monitor and isolate issues affecting the user-to-cloud application experience. That is, there is a need for IT administrators to have visibility into the network and details of service paths. Various User Experience (UX or UEX) tools and approaches seek to quantify an individual user's satisfaction with a product or service such as a networking application. Examples include End User Experience Monitoring (EUEM) tools, Network Performance Monitoring and Diagnostics Market (NPMD) tools, Application Performance Monitoring (APM) tools, and Digital Experience Monitoring (DEM) tools.

One aspect of these tools includes network measurements, such as using a traceroute. There are various tools to collect information about possible network paths followed by traffic. These tools give a holistic view of the complete network path. Traceroute is used "trace routes" of paths and measure packet delays in Internet Protocol (IP) networks. Traceroute is a diagnostic command to find the routes (paths) and measures the latency to each hop. In traceroute, each node is called a hop, and the latency is the round trip from the user's machine to the hop.

With increasing network sniffing and network threats, many enterprises use encrypted tunnels. Also, cloud-based systems can forward traffic to the cloud using encrypted tunnels. For example, tunnels can be based on Generic Routing Encapsulation (GRE), Layer Two Tunneling Protocol (L2TP), Internet Protocol (IP) Security (IPsec), Virtual Private Networks (VPN), Hypertext Transfer Protocol (HTTP), Transmission Control Protocol (TCP), etc. Some of these tunnels are opaque to existing tools such as traceroute, causing the wrong details about network state.

Also, conventional TCP traceroute applications/tools cannot determine if the destination has been reached as they have no ability to read the response sent by the destination. The conventional traceroute has limitations that it might not be complete, and the results are not accurate for the final hop as the final hop does not provide the processing delay. The traceroute results might not be complete as the final destination might not respond to the probe. The conventional traceroute does not provide the latency between the hops. Routers typically have a very fast forward path as this is done in the hardware, but some routers take significant time to respond to Time to Live (TTL) expired messages as they do this through software.

BRIEF SUMMARY OF THE DISCLOSURE

The present disclosure relates to various techniques for using traceroute with tunnels and cloud-based systems for determining measures of network performance. The various techniques are used to detect network hops, packet loss, and latency from a client to a destination as well as discover how the client connects to the Internet and if any proxies or firewalls are present in the path. For determining a connection to the Internet, the present disclosure includes a technique to detect tunnels. For determining proxies or firewalls, the present disclosure utilizes an Application Programming Interface (API) to detect an egress router's IP port on a client's network. Once the client has visibility of the path (i.e., tunnels, proxies, firewalls, etc.), the client can communicate, such as out of band, to request other devices to trace different legs. Note, in various descriptions, the term traceroute or trace can also include PING, such as the My Traceroute (MTR).

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a block diagram of a server that may be used in the cloud-based system of FIGS. 1 and 2 or the like;

FIG. 4 is a block diagram of a user device that may be used with the cloud-based system of FIGS. 1 and 2 or the like;

FIG. 11 is a network diagram of a traceroute between a user and a destination with no tunnel in between;

FIG. 13 is a flowchart of a process for detecting a tunnel between a user device and a destination;

FIG. 14 is a flowchart of a process for collecting network details in a trace where there is an opaque tunnel;

FIGS. 31-34 illustrate an example operation of the differential average latency adjustment.

DETAILED DESCRIPTION OF THE DISCLOSURE

Again, the present disclosure relates to various techniques for using traceroute with tunnels and cloud-based systems for determining measures of network performance. The various techniques are used to detect network hops, packet loss, and latency from a client to a destination as well as discover how the client connects to the Internet and if any proxies or firewalls are present in the path. For determining a connection to the Internet, the present disclosure includes a technique to detect tunnels. For determining proxies or firewalls, the present disclosure utilizes an Application Programming Interface (API) to detect an egress router's IP port on a client's network. Once the client has visibility of the path (i.e., tunnels, proxies, firewalls, etc.), the client can communicate, such as out of band, to request other devices to trace different legs. Note, in various descriptions, the term traceroute or trace can also include PING, such as the My Traceroute (MTR).

§ 1.0 Example Cloud-Based System Architecture

Figure 1:
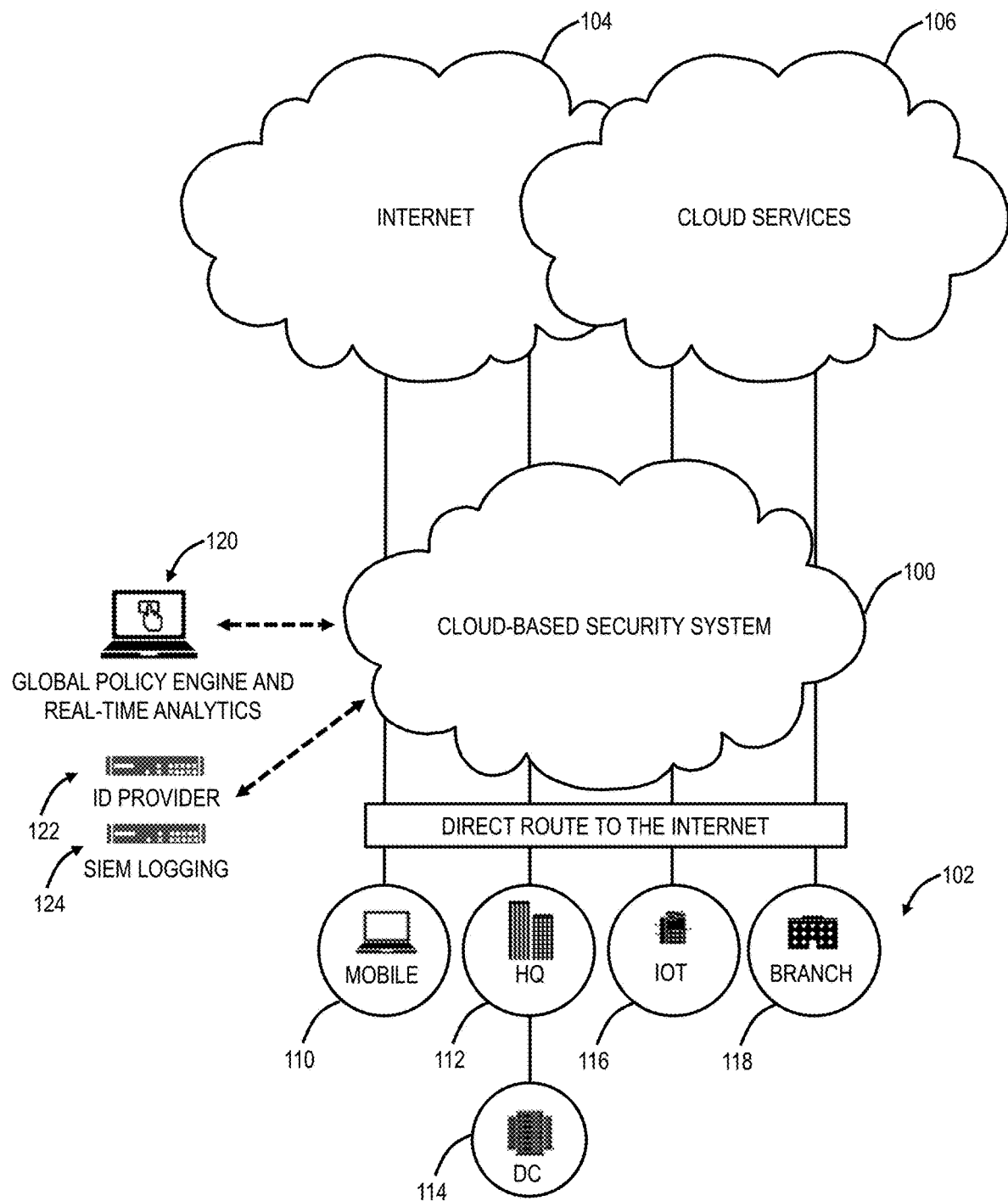
FIG. 1 is a network diagram of a cloud-based system offering security as a service.

FIG. 1 is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, anti-malware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 5:
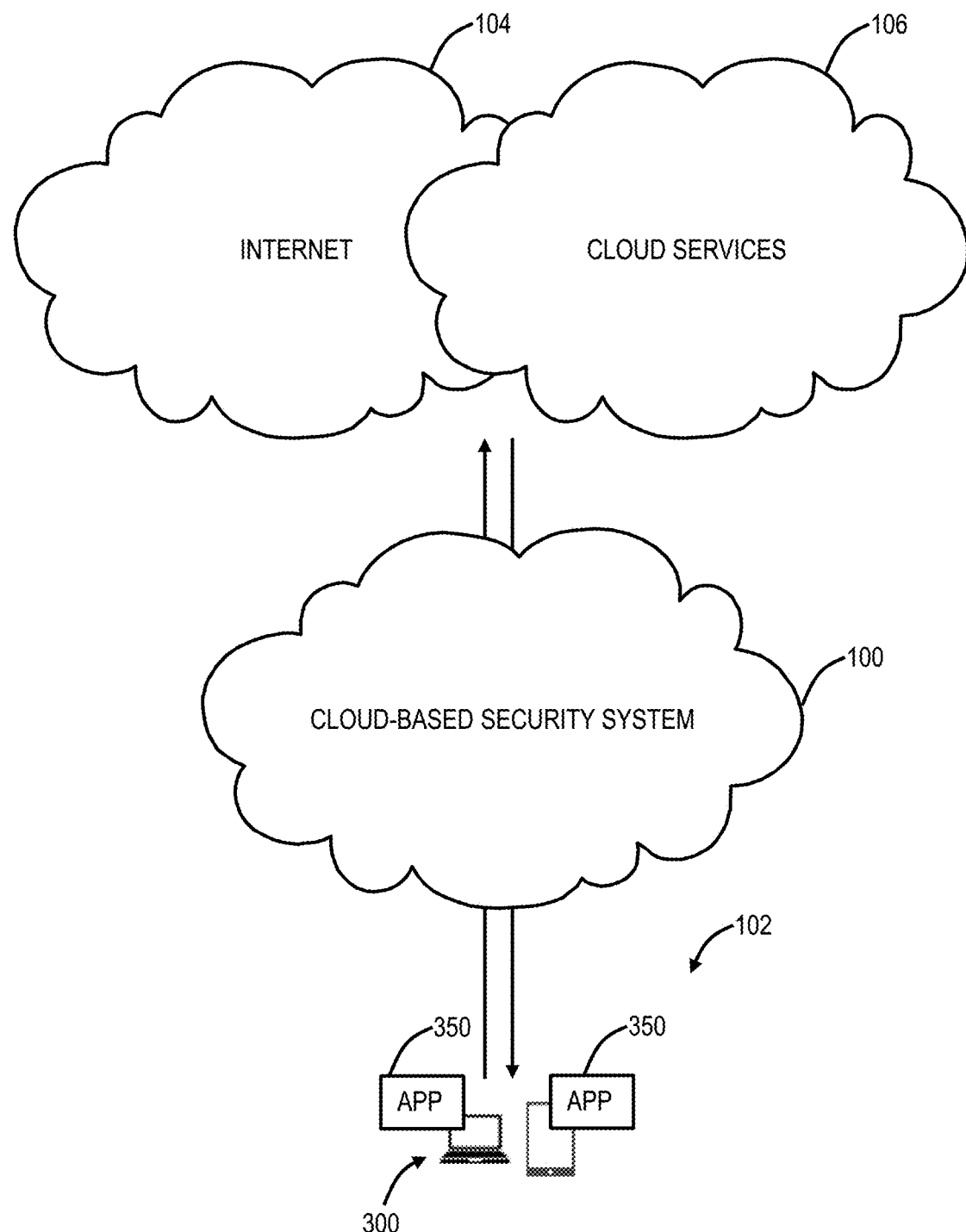
FIG. 5 is a network diagram of the cloud-based system illustrating an application on user devices with users configured to operate through the cloud-based system.

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes— they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as GRE, L2TP, IPsec, customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Figure 2:
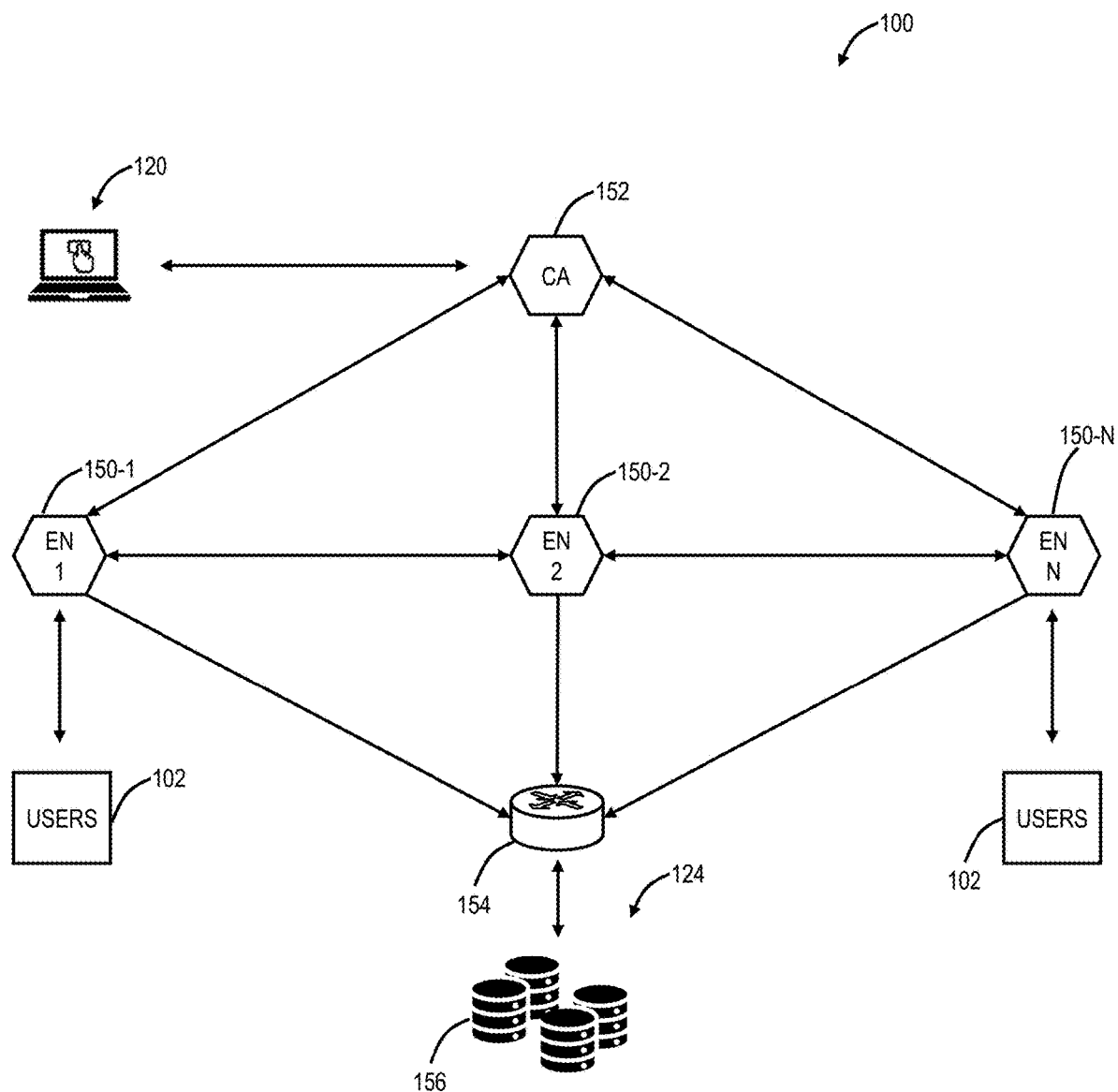
FIG. 2 is a network diagram of an example implementation of the cloud-based system.
Figure 4:
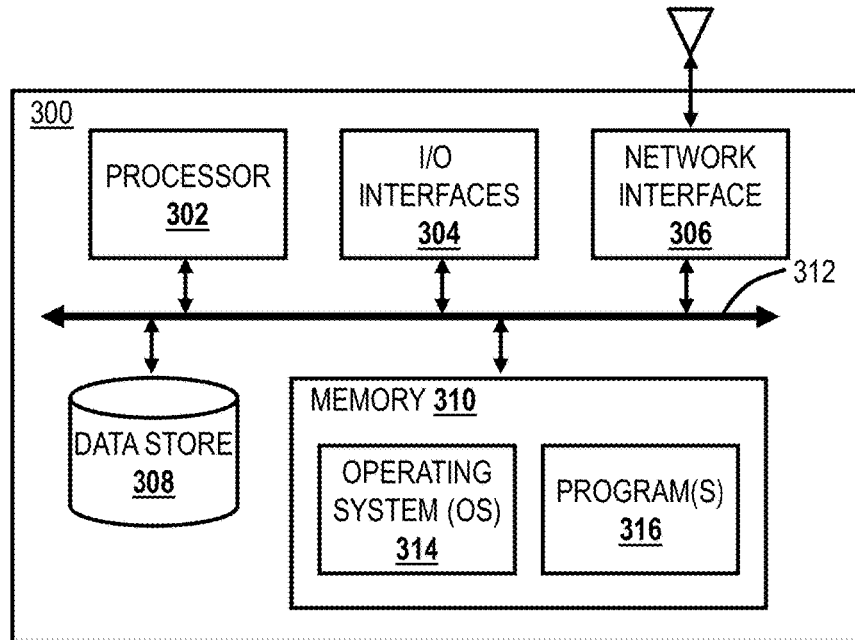

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150. Of note, the cloud-based system is an external system meaning it is separate from tenant's private networks (enterprise networks) as well as from networks associated with the devices 110, 116, and locations 112, 118.

The enforcement nodes 150 are full-featured secure internet gateways that provide integrated internet security. They inspect all web traffic bi-directionally for malware and enforce security, compliance, and firewall policies, as described herein, as well as various additional functionality. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the enforcement nodes 150. In another embodiment, specific data specified by each tenant, e.g., only email, only executable files, etc., is processed through one of the enforcement nodes 150.

Each of the enforcement nodes 150 may generate a decision vector $D=[d1, d2, \ldots, dn]$ for a content item of one or more parts $C=[c1, c2, \ldots, cm]$. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 150 may allow the distribution of the content item, preclude distribution of the content item, allow distribution of the content item after a cleaning process, or perform threat detection on the content item. In an embodiment, the actions taken by one of the enforcement nodes 150 may be determinative on the threat classification of the content item and on a security policy of the tenant to which the content item is being sent from or from which the content item is being requested by. A content item is violating if, for any part C=[c1, c2, . . . , cm] of the content item, at any of the enforcement nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

§ 2.0 User Device Application for Traffic Forwarding and Monitoring

Figure 3:
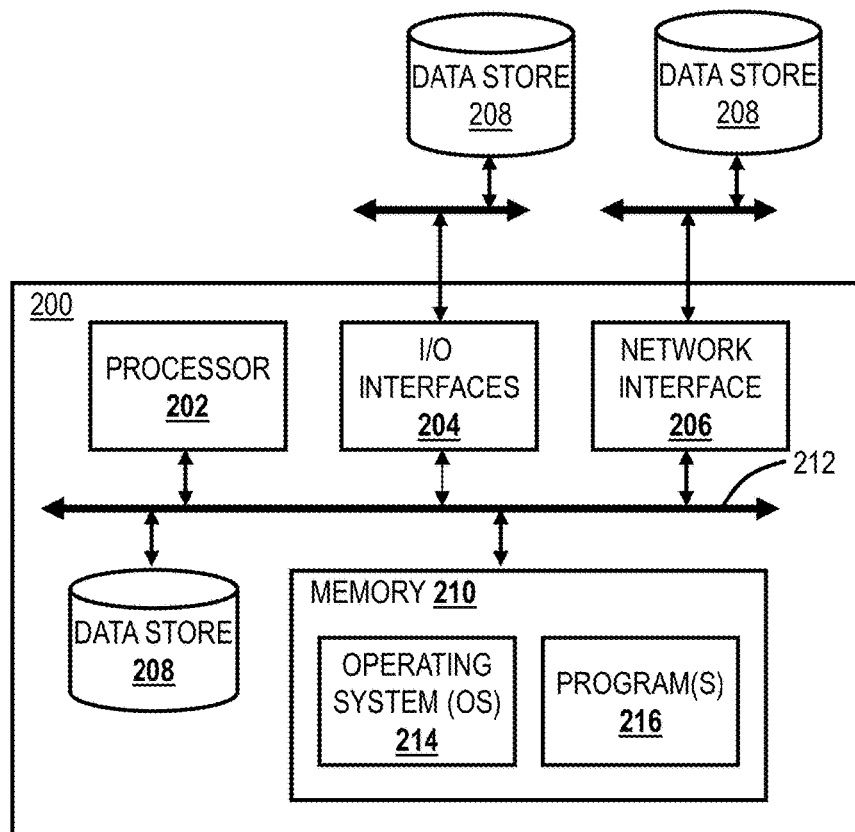

FIG. 3 is a network diagram of the cloud-based system 100 illustrating an application 350 on user devices 300 with users 102 configured to operate through the cloud-based system 100. Different types of user devices 300 are proliferating, including Bring Your Own Device (BYOD) as well as IT-managed devices. The conventional approach for a user device 300 to operate with the cloud-based system 100 as well as for accessing enterprise resources includes complex policies, VPNs, poor user experience, etc. The application 350 can automatically forward user traffic with the cloud-based system 100 as well as ensuring that security and access policies are enforced, regardless of device, location, operating system, or application. The application 350 automatically determines if a user 102 is looking to access the open Internet 104, a SaaS app, or an internal app running in public, private, or the datacenter and routes mobile traffic through the cloud-based system 100. The application 350 can support various cloud services, including ZIA, ZPA, ZDX, etc., allowing the best in class security with zero trust access to internal apps. As described herein, the application 350 can also be referred to as a connector application.

The application 350 is configured to auto-route traffic for seamless user experience. This can be protocol as well as application-specific, and the application 350 can route traffic with a nearest or best fit enforcement node 150. Further, the application 350 can detect trusted networks, allowed applications, etc. and support secure network access. The application 350 can also support the enrollment of the user device 300 prior to accessing applications. The application 350 can uniquely detect the users 102 based on fingerprinting the user device 300, using criteria like device model, platform, operating system, etc. The application 350 can support Mobile Device Management (MDM) functions, allowing IT personnel to deploy and manage the user devices 300 seamlessly. This can also include the automatic installation of client and SSL certificates during enrollment. Finally, the application 350 provides visibility into device and app usage of the user 102 of the user device 300.

The application 350 supports a secure, lightweight tunnel between the user device 300 and the cloud-based system 100. For example, the lightweight tunnel can be HTTP-based. With the application 350, there is no requirement for PAC files, an IPsec VPN, authentication cookies, or user 102 setup.

§ 3.0 Example Server Architecture

FIG. 4 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

§ 4.0 Example User Device Architecture

FIG. 5 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 5 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

§ 5.0 Zero Trust Network Access Using the Cloud-Based System

Figure 6:
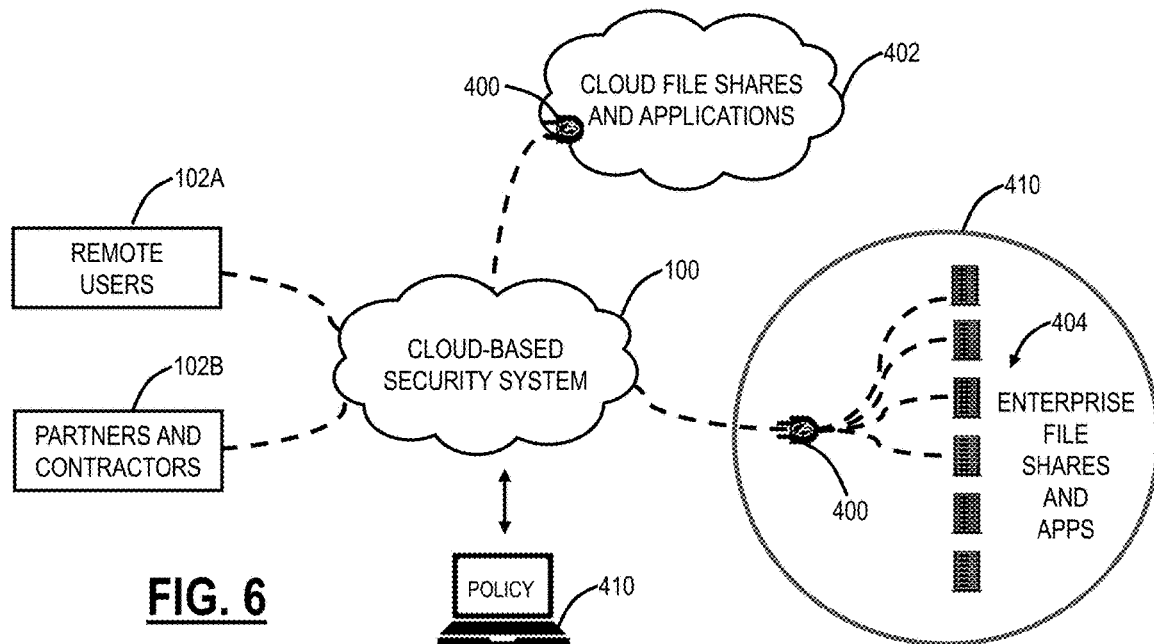
FIG. 6 is a network diagram of a Zero Trust Network Access (ZTNA) application utilizing the cloud-based system of FIGS. 1 and 2.

FIG. 6 is a network diagram of a Zero Trust Network Access (ZTNA) application utilizing the cloud-based system 100. For ZTNA, the cloud-based system 100 can dynamically create a connection through a secure tunnel between an endpoint (e.g., users 102A, 102B) that are remote and an on-premises connector 400 that is either located in cloud file shares and applications 402 and/or in an enterprise network 410 that includes enterprise file shares and applications 404. The connection between the cloud-based system 100 and on-premises connector 400 is dynamic, on-demand, and orchestrated by the cloud-based system 100. A key feature is its security at the edge—there is no need to punch any holes in the existing on-premises firewall. The connector 400 inside the enterprise (on-premises) "dials out" and connects to the cloud-based system 100 as if too were an endpoint. This on-demand dial-out capability and tunneling authenticated traffic back to the enterprise is a key differentiator for ZTNA. Also, this functionality can be implemented in part by the application 350 on the user device 300. Also, the applications 402, 404 can include B2B applications. Note, the difference between the applications 402, 404 is the applications 402 are hosted in the cloud, whereas the applications 404 are hosted on the enterprise network 410. The B2B service described herein contemplates use with either or both of the applications 402, 404.

The paradigm of virtual private access systems and methods is to give users network access to get to an application and/or file share, not to the entire network. If a user is not authorized to get the application, the user should not be able even to see that it exists, much less access it. The virtual private access systems and methods provide an approach to deliver secure access by decoupling applications 402, 404 from the network, instead of providing access with a connector 400, in front of the applications 402, 404, an application on the user device 300, a central authority 152 to push policy, and the cloud-based system 100 to stitch the applications 402, 404 and the software connectors 400 together, on a per-user, per-application basis.

With the virtual private access, users can only see the specific applications 402, 404 allowed by the central authority 152. Everything else is "invisible" or "dark" to them. Because the virtual private access separates the application from the network, the physical location of the application 402, 404 becomes irrelevant—if applications 402, 404 are located in more than one place, the user is automatically directed to the instance that will give them the best performance. The virtual private access also dramatically reduces configuration complexity, such as policies/firewalls in the data centers. Enterprises can, for example, move applications to Amazon Web Services or Microsoft Azure, and take advantage of the elasticity of the cloud, making private, internal applications behave just like the marketing leading enterprise applications. Advantageously, there is no hardware to buy or deploy because the virtual private access is a service offering to end-users and enterprises.

§ 6.0 Digital Experience Monitoring

Figure 7:
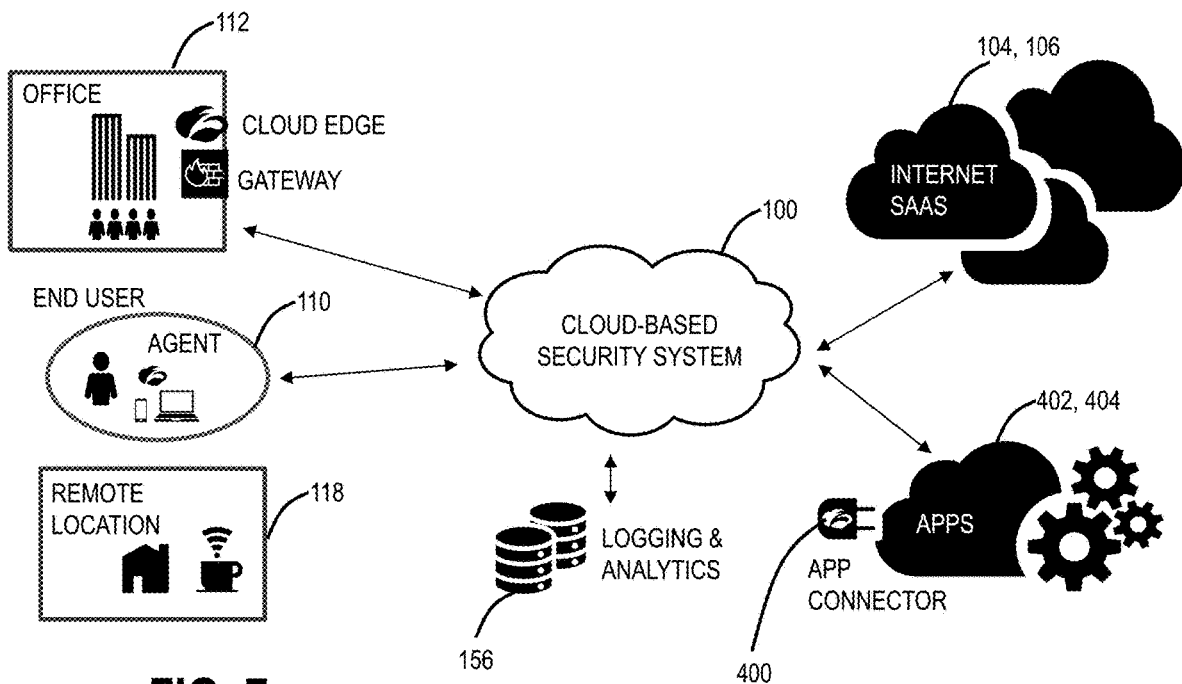
FIG. 7 is a network diagram of the cloud-based system of FIGS. 1 and 2 in an application of digital experience monitoring.

FIG. 7 is a network diagram of the cloud-based system 100 in an application of digital experience monitoring. Here, the cloud-based system 100 providing security as a service as well as ZTNA, can also be used to provide real-time, continuous digital experience monitoring, as opposed to conventional approaches (synthetic probes). A key aspect of the architecture of the cloud-based system 100 is the inline monitoring. This means data is accessible in real-time for individual users from end-to-end. As described herein, digital experience monitoring can include monitoring, analyzing, and improving the digital user experience.

The cloud-based system 100 connects users 102 at the locations 110, 112, 118 to the applications 402, 404, the Internet 104, the cloud services 106, etc. The inline, end-to-end visibility of all users enables digital experience monitoring. The cloud-based system 100 can monitor, diagnose, generate alerts, and perform remedial actions with respect to network endpoints, network components, network links, etc. The network endpoints can include servers, virtual machines, containers, storage systems, or anything with an IP address, including the Internet of Things (IoT), cloud, and wireless endpoints. With these components, these network endpoints can be monitored directly in combination with a network perspective. Thus, the cloud-based system 100 provides a unique architecture that can enable digital experience monitoring, network application monitoring, infrastructure component interactions, etc. Of note, these various monitoring aspects require no additional components—the cloud-based system 100 leverages the existing infrastructure to provide this service.

Again, digital experience monitoring includes the capture of data about how end-to-end application availability, latency, and quality appear to the end user from a network perspective. This is limited to the network traffic visibility and not within components, such as what application performance monitoring can accomplish. Networked application monitoring provides the speed and overall quality of networked application delivery to the user in support of key business activities. Infrastructure component interactions include a focus on infrastructure components as they interact via the network, as well as the network delivery of services or applications. This includes the ability to provide network path analytics.

The cloud-based system 100 can enable real-time performance and behaviors for troubleshooting in the current state of the environment, historical performance and behaviors to understand what occurred or what is trending over time, predictive behaviors by leveraging analytics technologies to distill and create actionable items from the large dataset collected across the various data sources, and the like. The cloud-based system 100 includes the ability to directly ingest any of the following data sources network device-generated health data, network device-generated traffic data, including flow-based data sources inclusive of NetFlow and IPFIX, raw network packet analysis to identify application types and performance characteristics, HTTP request metrics, etc. The cloud-based system 100 can operate at 10 gigabits (10G) Ethernet and higher at full line rate and support a rate of 100,000 or more flows per second or higher.

The applications 402, 404 can include enterprise applications, Office 365, Salesforce, Skype, Google apps, internal applications, etc. These are critical business applications where user experience is important. The objective here is to collect various data points so that user experience can be quantified for a particular user, at a particular time, for purposes of analyzing the experience as well as improving the experience. In an embodiment, the monitored data can be from different categories, including application-related, network-related, device-related (also can be referred to as endpoint-related), protocol-related, etc. Data can be collected at the application 350 or the cloud edge to quantify user experience for specific applications, i.e., the application-related and device-related data. The cloud-based system 100 can further collect the network-related and the protocol-related data (e.g., Domain Name System (DNS) response time).

Application-Related Data

| | |
|---|---|
| Page Load Time | Redirect count (#) |
| Page Response Time | Throughput (bps) |
| Document Object Model (DOM) Load Time | Total size (bytes) |
| Total Downloaded bytes | Page error count (#) |
| App availability (%) | Page element count by category (#) |

Network-Related Data

| | |
|---|---|
| HTTP Request metrics | Bandwidth |
| Server response time | Jitter |
| Ping packet loss (%) | Trace Route |
| Ping round trip | DNS lookup trace |
| Packet loss (%) | GRE/IPSec tunnel monitoring |
| Latency | MTU and bandwidth measurements |

Device-Related Data (Endpoint-Related Data)

| | |
|---|---|
| System details | Network (config) |
| Central Processing Unit (CPU) | Disk |
| Memory (RAM) | Processes |
| Network (interfaces) | Applications |

Metrics could be combined. For example, device health can be based on a combination of CPU, memory, etc. Network health could be a combination of Wi-Fi/LAN connection health, latency, etc. Application health could be a combination of response time, page loads, etc. The cloud-based system 100 can generate service health as a combination of CPU, memory, and the load time of the service while processing a user's request. The network health could be based on the number of network path(s), latency, packet loss, etc.

The lightweight connector 400 can also generate similar metrics for the applications 402, 404. In an embodiment, the metrics can be collected while a user is accessing specific applications that user experience is desired for monitoring. In another embodiment, the metrics can be enriched by triggering synthetic measurements in the context of an inline transaction by the application 350 or cloud edge. The metrics can be tagged with metadata (user, time, app, etc.) and sent to a logging and analytics service for aggregation, analysis, and reporting. Further, network administrators can get UEX reports from the cloud-based system 100. Due to the inline nature and the fact the cloud-based system 100 is an overlay (in-between users and services/applications), the cloud-based system 100 enables the ability to capture user experience metric data continuously and to log such data historically. As such, a network administrator can have a long-term detailed view of the network and associated user experience.

§ 7.0 Cloud Tunnel

Figure 8:
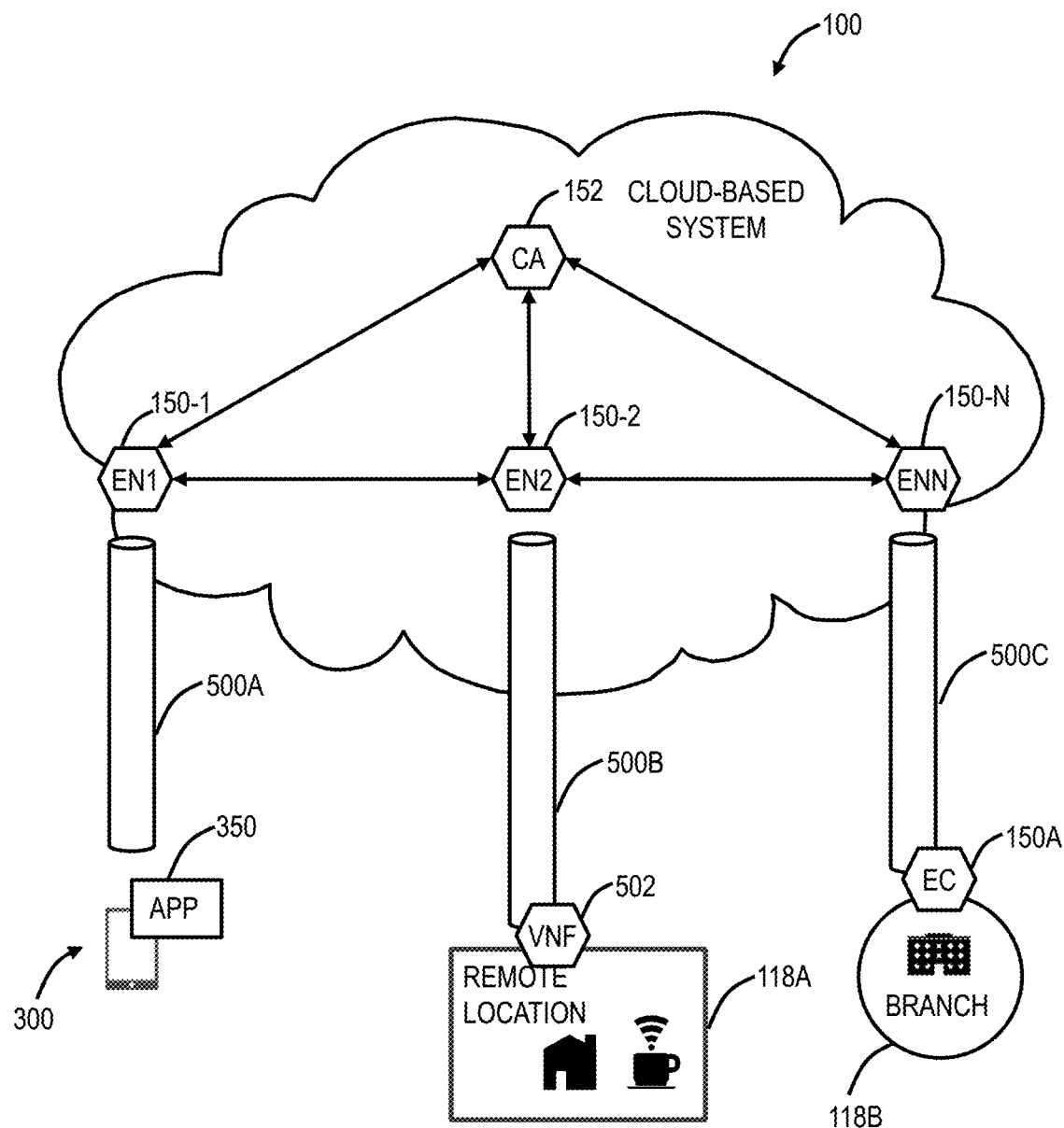
FIG. 8 is a network diagram of the cloud-based system of FIGS. 1 and 2 with various cloud tunnels, labeled as cloud tunnels, for forwarding traffic.
Figure 9:
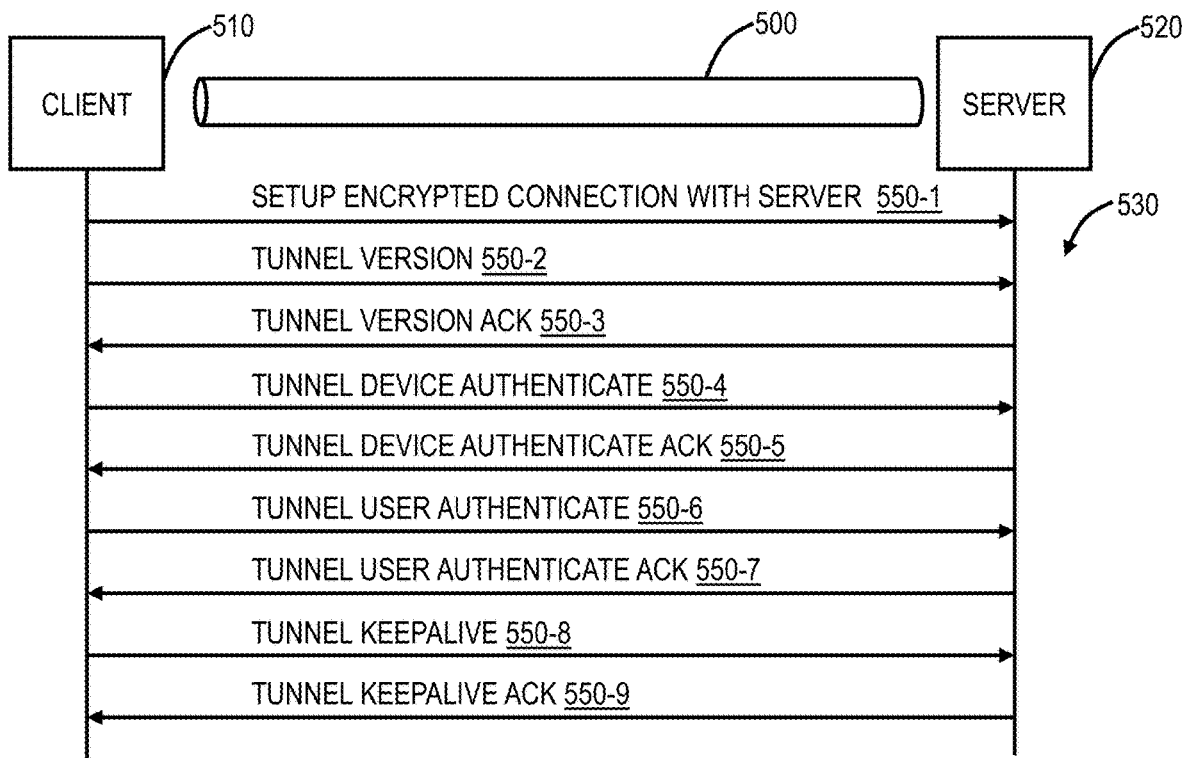
FIGS. 9 and 10 are flow diagrams of a cloud tunnel illustrating a control channel (FIG. 9) and a data channel (FIG. 10), with the tunnel illustrated between a client and a server.
Figure 10:
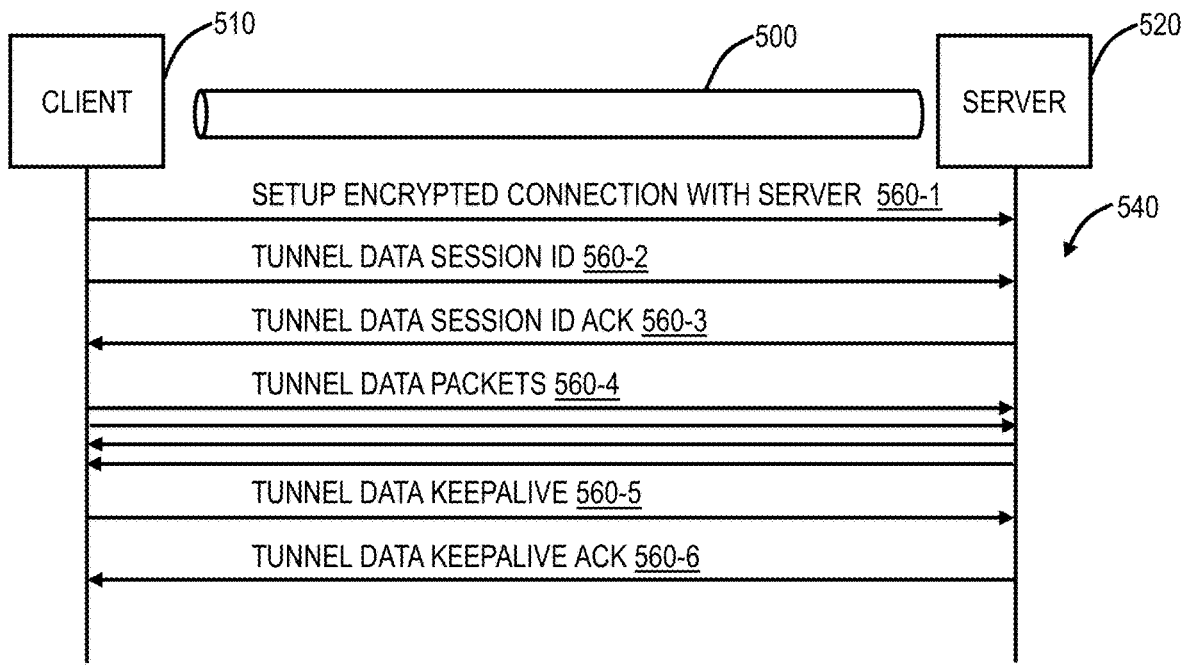

FIG. 8 is a network diagram of the cloud-based system 100 with various cloud tunnels 500, labeled as cloud tunnels 500A, 500B, 500C, for forwarding traffic. FIGS. 9 and 10 are flow diagrams of a cloud tunnel 500 illustrating a control channel (FIG. 9) and a data channel (FIG. 10), with the tunnel illustrated between a client 510 and a server 520. The cloud tunnel 500 is a lightweight tunnel that is configured to forward traffic between the client 510 and the server 520. The present disclosure focuses on the specific mechanisms used in the cloud tunnel 500 between two points, namely the client 510 and the server 520. Those skilled in the art will recognize the cloud tunnel 500 can be used with the cloud-based system 100 as an example use case, and other uses are contemplated. That is, the client 510 and the server 520 are just endpoint devices that support the exchange of data traffic and control traffic for the tunnel 500. For description, the server 520 can be referred to as a local node and the client 510 as a remote node, where the tunnel operates between the local and remote nodes.

In an embodiment, the cloud-based system 100 can use the cloud tunnel 500 to forward traffic to the enforcement nodes 150, such as from a user device 300 with the application 350, from a branch office/remote location 118, etc. FIG. 8 illustrates three example use cases for the cloud tunnel 500 with the cloud-based system 100, and other uses are also contemplated. In a first use case, a cloud tunnel 500A is formed between a user device 300, such as with the application 350, and an enforcement node 150-1. For example, when a user 102 associated with the user device 300 connects to a network, the application 350 can establish the cloud tunnel 500A to the closest or best enforcement node 150-1, and forward the traffic through the cloud tunnel 500A so that the enforcement node 150-1 can apply the appropriate security and access policies. Here, the cloud tunnel 500A supports a single user 102, associated with the user device 300.

In a second use case, a cloud tunnel 500B is formed between a Virtual Network Function (VNF) 502 or some other device at a remote location 118A and an enforcement node 150-2. Here, the VNF 502 is used to forward traffic from any user 102 at the remote location 118A to the enforcement node 150-2. In a third use case, a cloud tunnel 110C is formed between an on-premises enforcement node, referred to as an Edge Connector (EC) 150A, and an enforcement node 150-N. The edge connector 150A can be located at a branch office 118A or the like. In some embodiments, the edge connector 150A can be an enforcement node 150 in the cloud-based system 100 but located on-premises with a tenant. Here, in the second and third use cases, the cloud tunnels 500B, 500C support multiple users 102.

There can be two versions of the cloud tunnel 500, referred to a tunnel 1 and tunnel 2. The tunnel 1 can only support Web protocols as an HTTP connect tunnel operating on a TCP streams. That is, the tunnel 1 can send all proxy-aware traffic or port 80/443 traffic to the enforcement node 150, depending on the forwarding profile configuration. This can be performed via CONNECT requests, similar to a traditional proxy.

The tunnel 2 can support multiple ports and protocols, extending beyond only web protocols. As described herein, the cloud tunnels 500 are the tunnel 2. In all of the use cases, the cloud tunnel 500 enables each user device 300 to redirect traffic destined to all ports and protocols to a corresponding enforcement node 150. Note, the cloud-based system 100 can include load balancing functionality to spread the cloud tunnels 500 from a single source IP address. The cloud tunnel 500 supports device logging for all traffic, firewall, etc., such as in the storage cluster 156. The cloud tunnel 500 utilizes encryption, such as via TLS or DTLS, to tunnel packets between the two points, namely the client 510 and the server 520. As described herein, the client 510 can be the user device 300, the VNF 502, and/or the edge connector 150A, and the server 520 can be the enforcement node 150. Again, other devices are contemplated with the cloud tunnel 500.

The cloud tunnel 500 can use a Network Address Translation (NAT) device that does not require a different egress IP for each device's 300 separate sessions. Again, the cloud tunnel 500 has a tunneling architecture that uses DTLS or TLS to send packets to the cloud-based system 100. Because of this, the cloud tunnel 500 is capable of sending traffic from all ports and protocols.

Thus, the cloud tunnel 500 provides complete protection for a single user 102, via the application 350, as well as for multiple users at remote locations 118, including multiple security functions such as cloud firewall, cloud IPS, etc. The cloud tunnel 500 includes user-level granularity of the traffic, enabling different users 102 on the same cloud tunnel 500 for the enforcement nodes 150 to provide user-based granular policy and visibility. In addition to user-level granularity, the cloud tunnel 500 can provide application-level granularity, such as by mapping mobile applications (e.g., Facebook, Gmail, etc.) to traffic, allowing for app-based granular policies.

FIGS. 9 and 10 illustrate the two communication channels, namely a control channel 530 and a data channel 540, between the client 510 and the server 520. Together, these two communication channels 530, 540 form the cloud tunnel 500. In an embodiment, the control channel 530 can be an encrypted TLS connection or SSL connection, and the control channel 530 is used for device and/or user authentication and other control messages. In an embodiment, the data channel 540 can be an encrypted DTLS or TLS connection, i.e., the data channel can be one or more DTLS or TLS connections for the transmit and receive of user IP packets. There can be multiple data channels 540 associated with the same control channel 530. The data channel 540 can be authenticated using a Session Identifier (ID) from the control channel 530.

Of note, the control channel 530 always uses TLS because some locations (e.g., the remote location 118A, the branch office 118B, other enterprises, hotspots, etc.) can block UDP port 443, preventing DTLS. Whereas TLS is widely used and not typically blocked. The data channel 540 preferably uses DTLS, if it is available, i.e., not blocked on the client 510. If it is blocked, the data channel 540 can use TLS instead. For example, DTLS is the primary protocol for the data channel 540 with TLS used as a fallback over TCP port 443 if DTLS is unavailable, namely if UDP port 443 is blocked at the client 510.

Figure 11:
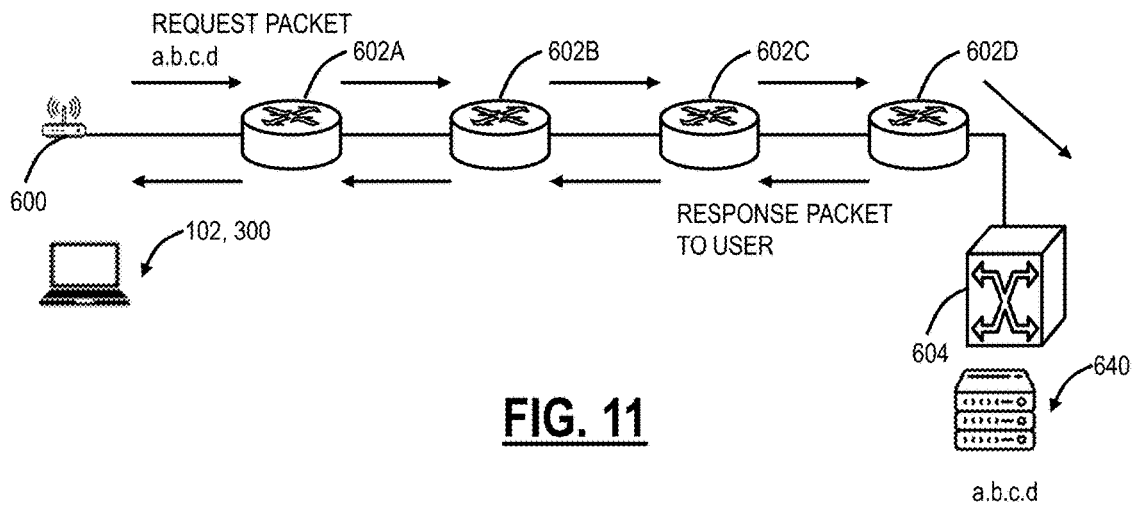

In FIG. 9, the control channel 530 is illustrated with exchanges between the client 510 and the server 520. Again, the control channel 530 includes TLS encryption, which is established through a setup or handshake between the client 510 and the server 520 (step 550-1). An example of a handshake is illustrated in FIG. 11. The client 510 can send its version of the tunnel 500 to the server 520 (step 550-2) to which the server 520 can acknowledge (step 550-3). For example, the version of the tunnel can include a simple version number or other indication, as well as an indication of whether the client 510 supports DTLS for the data channel 540. Again, the control channel 530 is fixed with TLS or SSL, but the data channel 540 can be either DTLS or TLS.

The client 510 can perform device authentication (step 550-4), and the server 520 can acknowledge the device authentication (step 550-5). The client 510 can perform user authentication (step 550-6), and the server 520 can acknowledge the user authentication (step 550-7). Note, the device authentication includes authenticating the user device 300, such as via the application 350, the VNF 502, the edge connector 150A, etc. The user authentication includes authenticating the users 102 associated with the user devices 300. Note, in an embodiment, the client 510 is the sole device 300, and here the user authentication can be for the user 102 associated with the client 510, and the device authentication can be for the user device 300 with the application 350. In another embodiment, the client 510 can have multiple user devices 300 and corresponding users 102 associated with it. Here, the device authentication can be for the VNF 502, the edge connector 150A, etc., and the user authentication can be for each user device 300 and corresponding user 102, and the client 510 and the server 520 can have a unique identifier for each user device 300, for user-level identification.

The device authentication acknowledgment can include a session identifier (ID) that is used to bind the control channel 530 with one or more data channels 540. The user authentication can be based on a user identifier (ID) that is unique to each user 102. The client 510 can periodically provide keep alive packets (step 550-8), and the server 520 can respond with keep alive acknowledgment packets (step 550-9). The client 510 and the server 520 can use the keep alive packets or messages to maintain the control channel 530. Also, the client 510 and the server 520 can exchange other relevant data over the control channel 530, such as metadata, which identifies an application for a user 102, location information for a user device 300, etc.

In FIG. 10, similar to FIG. 9, the data channel 540 is illustrated with exchanges between the client 510 and the server 520. Again, the data channel 540 includes TLS or DTLS encryption, which is established through a setup or handshake between the client 510 and the server 520 (step 560-1). An example of a handshake is illustrated in FIG. 11. Note, the determination of whether to use TLS or DTLS is based on the session ID, which is part of the device authentication acknowledgment, and which is provided over the data channel 540 (steps 560-2, 560-3). Here, the client 510 has told the server 520 its capabilities, and the session ID reflects what the server 520 has chosen, namely TLS or DTLS, based on the client's 510 capabilities. In an embodiment, the server 520 chooses DTLS if the client 510 supports it, i.e., if UDP port 443 is not blocked, otherwise the server 520 chooses TLS. Accordingly, the control channel 530 is established before the data channel 540. The data channel 540 can be authenticated based on the session ID from the control channel 530.

The data channel 540 includes the exchange of data packets between the client 510 and the server 520 (step 560-4). The data packets include an identifier such as the session ID and a user ID for the associated user 102. Additionally, the data channel 540 can include keep alive packets between the client 510 and the server 520 (steps 560-5, 560-6).

The cloud tunnel 500 can support load balancing functionality between the client 510 and the server 520. The server 520 can be in a cluster, i.e., multiple servers 200. For example, the server 520 can be an enforcement node 150 cluster in the cloud-based system 100. Because there can be multiple data channels 540 for a single control channel 530, it is possible to have the multiple data channels 540, in a single cloud tunnel 500, connected to different physical servers 200 in a cluster. Thus, the cloud-based system 100 can include load balancing functionality to spread the cloud tunnels 500 from a single source IP address, i.e., the client 510.

Also, the use of DTLS for the data channels 540 allows the user devices 300 to switch networks without potentially impacting the traffic going through the tunnel 500. For example, a large file download could continue uninterrupted when a user device 300 moves from Wi-Fi to mobile, etc. Here, the application 350 can add some proprietary data to the DTLS client-hello servername extension. That proprietary data helps a load balancer balance the new DTLS connection to the same server 200 in a cluster where the connection prior to network change was being processed. So, a newly established DTLS connection with different IP address (due to network change) can be used to tunnel packets of the large file download that was started before the network change. Also, some mobile carriers use different IP addresses for TCP/TLS (control channel) and UDP/DTLS (data channel) flows. The data in DTLS client-hello helps the load balancer balance the control and data connection to the same server 200 in the cluster.

§ 8.0 Traceroute

Traceroute can be based on Internet Control Message Protocol (ICMP), TCP, User Datagram Protocol (UDP), etc. For example, a traceroute based on ICMP provides all hops on the network. TCP and UDP are also supported by most clients, if ICMP is blocked. The response from the traceroute provides a holistic view of the network with packet loss details and latency details. FIG. 11 is a network diagram of a traceroute between a user 102 and a destination 640 with no tunnel in between. Here, the user 102 (via a user device 300) connects to an access point 600, which connects to the destination 640 via routers 602A-602D and a switch 604. The traceroute includes transmitting a request packet from the user 102 to the destination 640 (with an address of a.b.c.d) via the access point 600, the routers 602, and the switch 604. Each of these intermediate devices 600, 602, 604 process the request packet and the enforcement node 150 sends a response packet back to the user 102, which is also processed by the intermediate devices 600, 602, 604. Accordingly, all hops in the network are visible.

Figure 12:
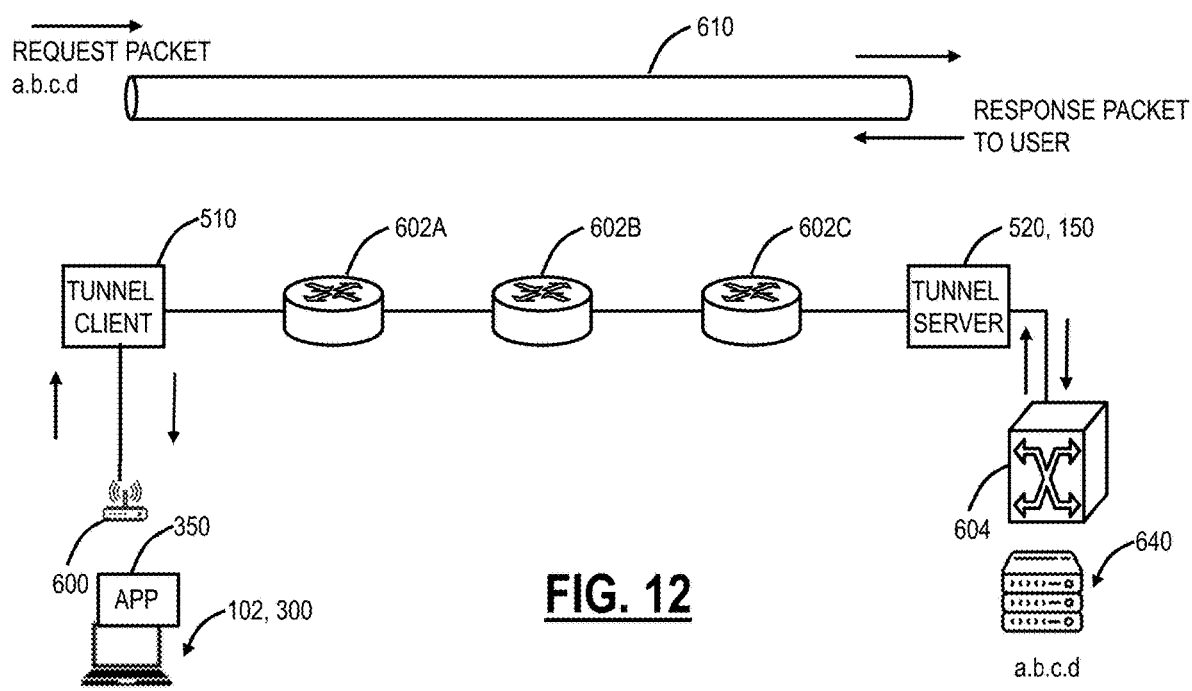
FIG. 12 is a network diagram of a traceroute between a user and a destination with an opaque tunnel between a tunnel client and a tunnel server.

FIG. 12 is a network diagram of a traceroute between a user 102 and the destination 640 with an opaque tunnel 610 between a tunnel client 510 and a tunnel server 520. The opaque tunnel 610 can be the tunnel 500 as well as a GRE, IPsec, VPN, etc. The opaque tunnel 610 is referred to as opaque because there is no visibility into the tunnel. The traceroute in FIG. 12, based on ICMP, TCP, UDP, etc., provides visibility of the hops before and after the opaque tunnel 610, but does not provide visibility in the opaque tunnel 610. There are no details about packet loss or latency while tunneled transmission. Also, the opaque tunnel 610 can be referred to as an overlay tunnel.

Traceroute includes a series of packets that are exchanged from a probe initiator along a path. Each trace packet includes an increasing TTL value. When a node along the path receives a trace packet where the TTL expires, it sends a response. Based on all of the responses, it is possible for the probe initiator (e.g., the client) to determine the network hops, the latency at each hop, packet loss, and other details. Again, the traceroute can be an MTR, which also includes PING functionality. Again, MTR is used to traceroute the destination to show the latency, packet loss, and hop information between an initiator and destination. It helps to understand the network status and diagnose network issues.

In an embodiment, MTR is implemented on the user device 300, such as through the application 350, and on the tunnel server 520 and/or the enforcement node 150. As is described herein, there is a requirement to implement probes at two points in the service path—at the client and at the tunnel server 520 and/or the enforcement node 150. The MTR implementation can support ICMP, UDP, and/or TCP. For ICMP, two sockets are used to send and receive probes, and the ICMP sequence number in reply messages are used to match ICMP request messages. For UDP, one UDP socket is created to send UDP probes, and one ICMP socket is created to receive ICMP error messages. For TCP, one raw socket is created to send TCP probes, and one ICMP socket is created to receive ICMP error messages, and the TCP socket is also used to receive SYN-ACK/RST from the destination. The foregoing functionality can be performed by the application 350 on the user device 300 and a tracing service on the enforcement node 150. SYN=Synchronize, ACK=Acknowledgment, and RST=Reset.

§ 8.1 Detecting Opaque Tunnel

FIG. 13 is a flowchart of a process 650 for detecting a tunnel 500, 610 between a user device 300 and a destination. The process 650 is described with reference to the network in FIG. 12 with actions at the user device 300, the intermediate devices 600, 602, 604, and the tunnel server 520. Also, note that while the enforcement node 150 and the tunnel server 520 are illustrated as separate devices, it is also possible that these are combined in the same device. Also, actions at the user device 300 (client) can be performed via the application 350 executed thereon. The tunnel server 520 can be a proxy or transparent proxy.

The process 650 includes the client sending a trace packet for the destination (e.g., the node 150 with an address of a.b.c.d) with a Signature-A (step 651). Note, the client (e.g., the user device 300) does not know if there is a tunnel or not between the destination and itself. The purpose of the Signature-A is for any tunnel server 520 to detect this trace packet and provide tunnel details, i.e., to allow the client to detect the tunnel. The Signature-A can be any encrypted data for security.

The process 650 further includes the tunnel server detecting the Signature-A as a valid signature and intercepting the trace packet (step 652). In FIG. 12, even though the tunnel server 520 is not the destination, it intercepts the trace packet because of the presence of the Signature-A and responds. Namely, the tunnel server responds to the trace packet with tunnel info (step 653). The client receives the trace response from the tunnel server (instead of the destination) and is informed about the tunnel, and can take appropriate action (step 654). The tunnel info can include IP address, tunnel type, protocol, etc. As described herein, appropriate action includes determining a trace via different legs to account for the tunnel. Also, as described herein, a leg is a segment of the network between the client and the destination. Without a tunnel, there is a single leg between the client and the destination. With a tunnel, there is a plurality of legs with at least one leg being the tunnel itself.

If there is a transparent proxy present with an overlay tunnel to it from the client, the client sends traceroute probes with a signature to detect the presence of the proxy. When the packets traverse through the proxy, it scans for the signature in the payload, which can be encrypted using a shared key that can be rotated constantly. If the signature matches, the proxy identifies this as a probe generated by a trusted client and identifies itself as a proxy by responding to the probe with an encrypted signature. On receiving the probe response, the client would be able to identify the proxy in the path and request it to find the hops through the overlay tunnel. The request to the proxy can be performed out of band.

§ 8.2 Collecting Network Details Including a Tunnel

FIG. 14 is a flowchart of a process 660 for collecting network details in a trace where there is an opaque tunnel. The process 660 is described with reference to the network in FIG. 12 with actions at the user device 300, the intermediate devices 600, 602, 604, and the tunnel server 520. Further, the process 660 can be used with the process 660. Also, while described with reference to the enforcement node 150 as the destination, the process 660 contemplates operation with any type of computing device. Also, note that while the enforcement node 150 and the tunnel server 520 are illustrated as separate devices, it is also possible that these are combined in the same device. Also, actions at the user device 300 (client) can be performed via the application 350 executed thereon.

Once an opaque tunnel is detected, the process 660 is used to collect details of the service path between the client and the destination. The process 660 includes, responsive to detection of a tunnel, dividing the network from the client to the destination into a plurality of legs (step 661). A trace is performed separately on all of the plurality of legs (step 662), and the results of the trace on all of the plurality of legs are aggregated to provide a holistic view of the network (step 663).

The objective in segmenting the network into different legs is to provide visibility with the tunnel. Specifically, a trace is performed in the tunnel, such as via the tunnel server which is performing a so-called "reverse traceroute." Here, the tunnel server is sending trace packets through the tunnel without tunnel encapsulation so that details of the trace can be obtained in the opaque tunnel. These details are combined with traces from the other legs to provide full visibility.

For the example of FIG. 12, once the client (user device 300) knows about tunnel, the network can be divided into three segments:

Leg-1: From the user device 300 to an egress router 630,
Leg-2: From the tunnel client 510 to the tunnel server 520 (i.e., the opaque tunnel 610), and
Leg-3: From the tunnel server 520 to the destination (node 150).

For the Leg-1, the trace can be performed as normal.

For the Leg-2, the trace is performed between the egress router 630 and the tunnel server 520. This is the reverse traceroute where the tunnel 610 is traced by the tunnel server. In an embodiment, the client, knowing there is an opaque tunnel based on the signature used in the process 650, requests the tunnel server trace the tunnel. That is, the client sends a request for tracing by the tunnel server to the tunnel client, i.e., a reverse trace. The tunnel server performs the reverse trace, collects the results and forwards them to the client.

For the Leg-3, either the client can send a trace packet without the signature to trace the Leg-3 or the client can request the tunnel server perform a trace to the destination on its behalf. If the trace packet is sent from the client without the signature, the results will include details from Legs 1 and 2, which can be subtracted out since the results from Legs 1 and 2 are also separately obtained. Finally, the client can process all of the results from the three legs to present a holistic view of the network. Note, Leg-2 and Leg-3 go habd in hand—either you have both or none. If there is none, then the client only has one leg to the destination.

The foregoing assumes the tunnel client 510 is on the public Internet and reachable from the tunnel server 520, i.e., the outside world can connect to the tunnel client 510. However, most tunnel clients 510 are on an internal network behind a firewall, making it a problem for the tunnel server 520 to reverse trace to the tunnel client 510. Thus, there are additional steps in this scenario.

Consider the issue of the tunnel client 510 being behind a firewall; there is a need to modify the network segments as follows:

Leg-1: From the user device 300 to an egress router 630,
Leg-2: From the egress router 630 to the tunnel server 520, and
Leg-3: From the tunnel server 520 to the destination.

As described herein, the egress router 630 is typically a router at an edge of a customer's network with a public IP address. The following describes the trace in each of these legs. For the Leg-3, the client can send the trace packet without the signature or request the tunnel server 520 to perform this leg on its behalf, i.e., the same as described above.

For the Leg-2, the following steps are needed, note these are as described above except the target is the egress router 630. The tunnel server 520 is performing a reverse trace based on accepting a request from the client, but the reverse trace is from the tunnel server 520 to the egress router 630. The tunnel server 520 provides the results to the client as before.

For the Leg-1, the client sends a trace packet to the egress router 630. And as before, finally, the client aggregates all three legs to present a holistic view of the network.

For the Leg-1, there are two possibilities for what can happen to the trace packet from the client to the egress router. For a case-1, the tunnel client 510 can route the trace packet into the opaque tunnel 610. For a case-2, the tunnel client 510 does not route the trace packet into the opaque tunnel 610, i.e., bypasses it. For the case-2, this yields the trace to the egress router 630 data. However, for the case-1, this provides the wrong network path, namely from the client to the tunnel client 510 to the tunnel server 520 to the Internet to the egress router 630. That is, the trace packet echoes from the tunnel server 520 providing the wrong network path. There is a need for the client to detect this wrong network path.

To detect the wrong path for the Leg-1, the client can be configured to insert another signature, Signature-B, in the trace packet for the egress router 630. The objective is for the trace packet to reach the egress router 630 for a response. The purpose of this Signature-B is for the tunnel server 520 to detect it and provide a flag in the response. If the client gets a response to this trace packet with the flag therein, the client knows the trace went on the wrong network path, i.e., through the tunnel 610 to the tunnel server 520. When this is detected, IT must reconfigure the tunnel client 510 to bypass the tunnel 610 for packets destined to the egress router 630. Of note, the use of the terms Signature-A and Signature-B is solely meant to differentiate these as different signatures for different purposes.

As described herein, the present disclosure includes various traces of different legs of a service path, such as using MTR, and having the client (or another device) aggregate the results. Of note, while the illustrated example embodiments describe the traces in order, those skilled in the art will appreciate any order is contemplated. For example, in some embodiments, the traces of Leg 1 are performed first, then Leg 2, etc. In other embodiments, the traces of Leg 2 are performed first, etc. Finally, the traces may be performed concurrently or at about the same time.

In an embodiment, the tunnel client 510 can be a tunnel originating from the application 350 and the egress router 630 can represent the public facing side of the network from where location tunnels (GRE/IPSEC) will originate. Most cases will have the user device 300 on a private IP talking to the outside world via a router or a Wi-Fi Access Point (AP) that is connected to an egress router 630 that has a public IP. The case of a tunnel client 510 having a public IP is rare and could happen when there is a device on cellular network. From the point of the enforcement node 150, it always traces the Leg 2 path from itself to the public IP the client comes out with. It does not care if it is an egress router or a tunnel-client end point that is on the public IP.

§ 8.3 Example Operation

Figure 15:
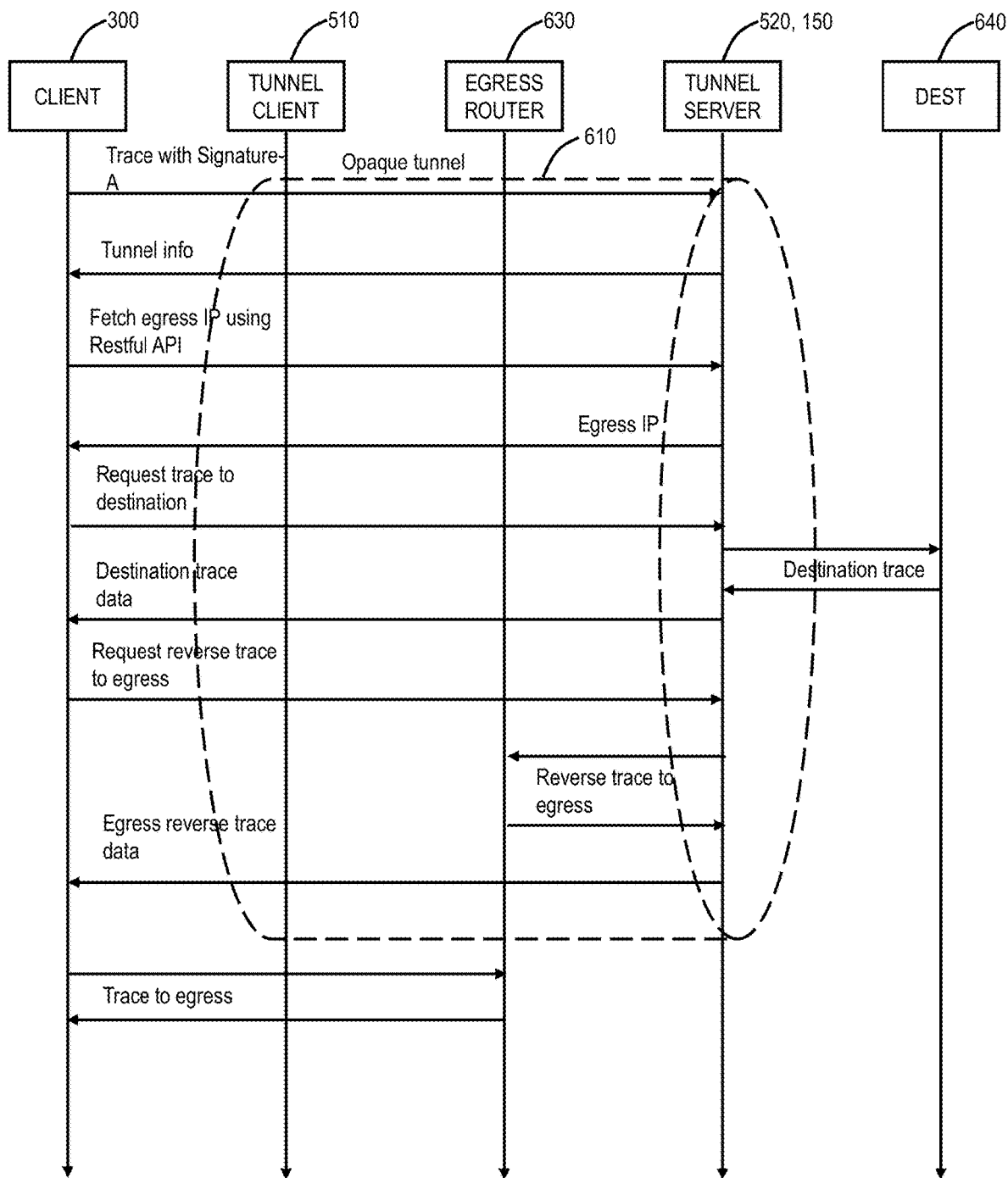
FIG. 15 is a flow diagram illustrating actions between the client (user device), the tunnel client, the egress router, the tunnel server, and the destination (node) in an example operation of the process of FIGS. 13 and 14.

FIG. 15 is a flow diagram illustrating actions between the client (user device 300), the tunnel client 510, the egress router 630, the tunnel server 520, and the destination 640 in an example operation of the processes 650, 660. Note, the processes 650, 660 can be orchestrated by the user device 300 (client) via the application 350. The client sends a trace packet to the destination with the Signature-A as described in the process 650. If the response comes back with no tunnel info in the response, then the full and accurate service path has been traced and the traceroute is complete. If there is tunnel info, the client knows there is the tunnel 610 and moves to the process 620.

In order to collect a full network path, first the client needs to detect if there is a tunnel on the path. Again, this is achieved by the client inserting a signature in a packet. The packet is intercepted by the tunnel server 520 and it will respond with tunnel information like type, IP, etc. Once the client notices the tunnel on the path, it will run the multi-segment approach in the process 660 to detect the full service path.

Next, the client fetches the egress IP using the restful API. The client assumes three network segments—Leg-1: Client to Egress, Leg-2: Egress to Tunnel Server, and Leg-3: Tunnel Server to Destination. The client performs the trace of the Leg-3 either directly or by requesting the tunnel server to perform it and collect information. The client performs the trace of Leg-2 by requesting the tunnel server perform the reverse trace. The client also sends a trace packet to the egress router 630 with the Signature-B. If there is no tunnel flag in the response, the client has the full and accurate Leg-1 information. If there is the tunnel flag in the response, there is a misconfiguration presented to the user.

Finally, the client aggregates all three legs and consumes the data. The tunnel server 520 can host a tracing service that will accept tracing requests from clients such as via a restful API call, an HTTP Post call, etc. This service will perform standard network tracing, collect the data and respond to clients. The resultant data can be displayed and used in different ways.

Figure 16:
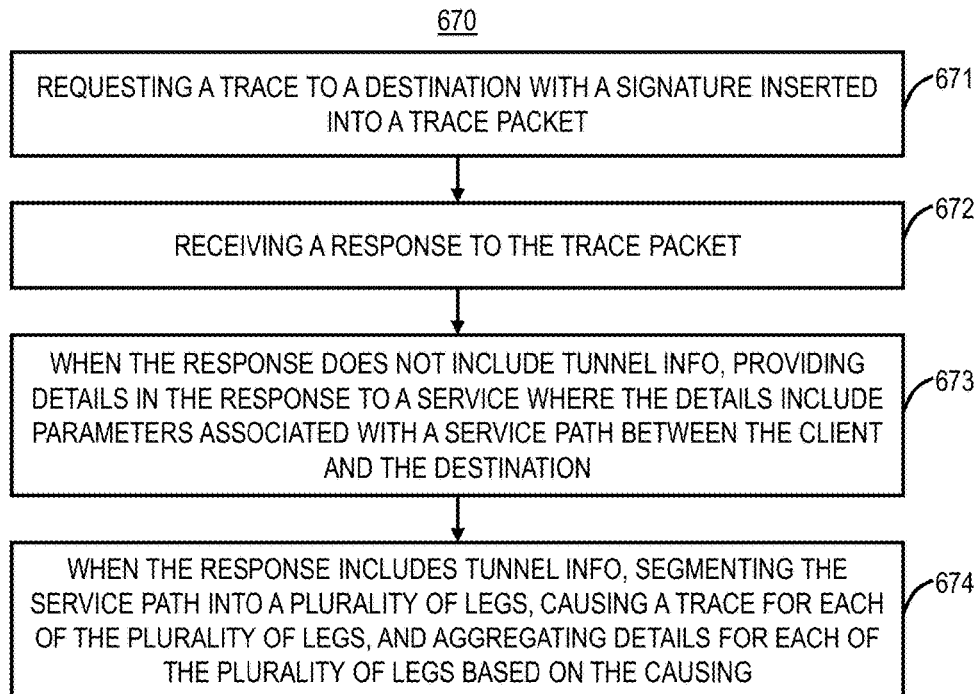
FIG. 16 is a flowchart of a process for detection of network hops and latency through an opaque tunnel and detection misconfiguration of tunnels.

§ 9.0 Detection of Network Hops and Latency Through an Opaque Tunnel and Detection Misconfiguration of Tunnels FIG. 16 is a flowchart of a process 670 for detection of network hops and latency through an opaque tunnel and detection misconfiguration of tunnels. The process 670 is described with reference to the user device 300, i.e., the client. The process 670 can be implemented as a method that includes steps, via the user device 300 configured to execute the steps, and via a non-transitory computer-readable medium that includes instructions that cause one or more processors to implement the steps.

The process 670 includes requesting a trace to a destination with a signature inserted into a trace packet (step 671); receiving a response to the trace packet (step 672); when the response does not include tunnel info, providing details in the response to a service where the details include parameters associated with a service path between the client and the destination (step 673); and when the response includes tunnel info, segmenting the service path into a plurality of legs, causing a trace for each of the plurality of legs, and aggregating details for each of the plurality of legs based on the causing (step 674).

When the response includes tunnel info, a tunnel server is configured to intercept the trace packet responsive to detection of the signature, and wherein the tunnel server responds to the trace packet with the response with the tunnel info. The aggregating details includes aggregating network hops, packet drops, and latency for each of the plurality of legs. The plurality of legs can include three legs. In an embodiment, a first leg is between the client and a tunnel client, a second leg is between the tunnel client and a tunnel server, and a third leg is between the tunnel server and the destination. In another embodiment, a first leg is between the client and an egress router, a second leg is between the egress router and a tunnel server, and a third leg is between the tunnel server and the destination.

The causing the trace for the plurality of legs can further include including a second signature in a second trace packet to an egress router, and the process 670 can further include receiving a response from the second trace packet; when the response does not include a flag, utilizing details from the response for a leg between the client and the egress router; and when the response includes the flag, determining a misconfiguration where the second trace packet was sent over a tunnel. At least one of the plurality of legs can include a reverse trace from a tunnel server. The tunnel info can include a type of tunnel including any of Generic Routing Encapsulation (GRE) and Internet Protocol (IP) Security (IPsec).

The process 670 helps detect the network hops, packet drops, and their latencies through tunnels like the GRE/IPsec or any other overlay tunnel. A typical network analyzer will not be able to find the hops, packet drops and their latency through individual routers that constitute the overlay tunnel as the probe traffic is encapsulated through the tunnel and the whole tunnel looks like a single hop. The process 670 enables a trace of the hops through the tunnel thus giving an insight into the hops inside the tunnel. The tracing of the path is done by initiating the probes from the other side of the tunnel without encapsulating the packet, i.e., from the a destination 640 towards the client which is called as "Reverse Traceroute" as described herein. This also helps detect if the overlay tunnels are correctly configured so that traffic bound to the internal network is not pulled into the tunnel.

§ 10.0 Detection of Latency, Packet Drops, and Network Hops Through a TCP Tunnel Using ICMP and UDP Probes In another embodiment, the tunnel can include a TCP connection, i.e., a TCP-based tunnel or an exclusive TCP overlay tunnel. The present disclosure can trace this path to detect statistics such as hops, packet drops, and latency through the exclusive TCP overlay tunnel using ICMP and UDP traffic. This approach leverages the approach in the process 670 to find the hops through the tunnel using a protocol other than TCP for which the tunnel was built. This approach uses the routing in the opposite direction as the enforcement of the TCP check made at the end of the tunnel that the client owns. The destination 640 sends probes from its side of the tunnel without using any tunnel encapsulation towards the client's egress router's IP.

Advantageously, this approach avoids using TCP-PINGs (use of TCP SYNs) from the client side towards the destination to avoid cases where firewall rules would flag issues thinking of it as an attack.

Figure 17:
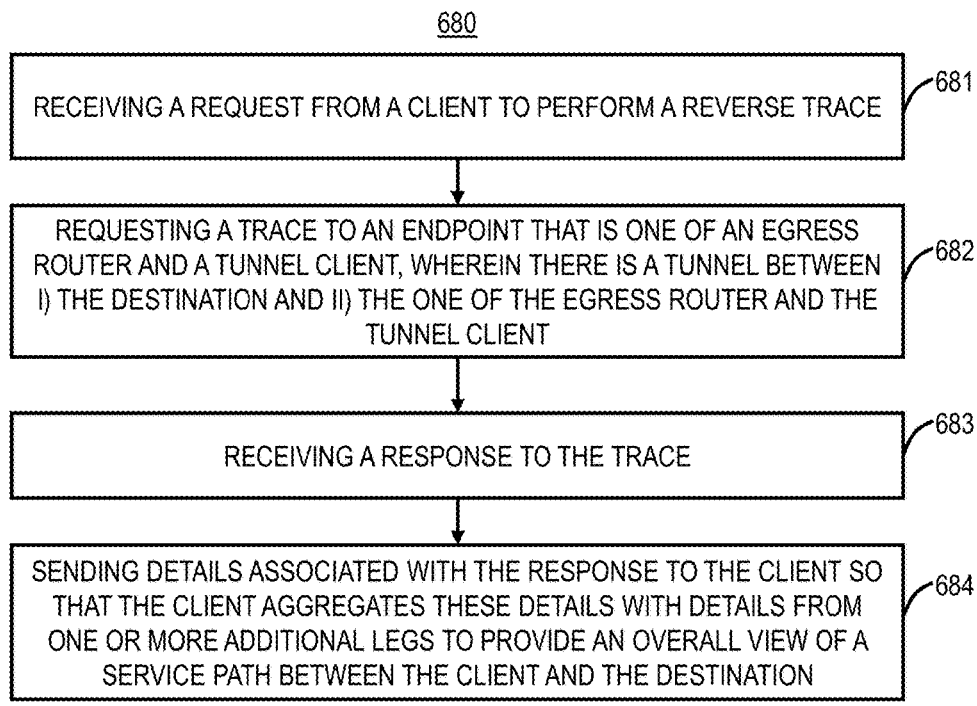
FIG. 17 is a flowchart of a process for detection of latency, packet drops, and network hops through a TCP tunnel using ICMP and UDP probes.

FIG. 17 is a flowchart of a process 680 for detection of latency, packet drops, and network hops through a TCP tunnel using ICMP and UDP probes. The process 680 is described with reference to the destination 640. The process 680 can be implemented as a method that includes steps, via the server 200 configured to execute the steps, and via a non-transitory computer-readable medium that includes instructions that cause one or more processors to implement the steps.

The process 680 includes receiving a request from a client to perform a reverse trace (step 681); requesting a trace to an endpoint that is one of an egress router and a tunnel client, wherein there is a tunnel between i) the destination and ii) the one of the egress router and the tunnel client (step 682); receiving a response to the trace (step 683); and sending details associated with the response to the client so that the client aggregates these details with details from one or more additional legs to provide an overall view of a service path between the client and the destination (step 684).

The process 680 can further include receiving a trace packet from the client with a signature included therein, wherein the signature is indicative of a request for tunnel info; and, responsive to detection of the signature, sending the tunnel info to the client in a response. The process 680 can further include receiving a trace packet from the client with a signature included therein, wherein the signature is indicative of a misconfiguration of a tunnel; and, responsive to detection of the signature, sending a flag to the client in a response indicative of the misconfiguration.

The destination can be one of a tunnel server and a node in a cloud-based system. The tunnel can utilize Transmission Control Protocol (TCP) and the trace to the endpoint utilizes a packet without tunnel encapsulation. The packet can utilize one of Internet Control Message Protocol (ICMP) and User Datagram Protocol (UDP). The request can be via a RESTful (Representational State Transfer) Application Programming Interface (API) call from the client.

§ 11.0 Detection of Latency, Packet Drops, and Network Hops Through a Tunnel by Tracing Hops Therein As described above, the tunnel 610 is an opaque overlay making it difficult to trace. The aforementioned approaches contemplate a reverse trace via unencapsulated packets. In an embodiment, the tunnel itself may be configured to perform the trace, such as via the cloud tunnel 500. There are two techniques the tunnel 500 can use to perform the trace inside the tunnel.

In a first approach, the tunnel 500 can be configured to identify probe traffic based on a predefined signature and inherits the IP TTL value of the probe packet. Note, as described herein, probe or probe traffic means traceroute packets. As the packet makes its way through the tunnel the packet's TTL would expire triggering an ICMP "Time Exceeded" error. This error is propagated by the tunnel to the probe initiator (such as the client) spoofing the IP address of the router that generated the error.

In a second approach, the tunnel 500 itself can initiate traceroute probes towards the other end of the tunnel 500 by increasing the TTL in the packets by one at a time. By tracing the path to the other end of the tunnel 500, the exact number of hops, packet drops, and latency inside the tunnel 500 is determined. This information can be provided to any of the clients/applications via an API so that they know the measure of these stats that can be combined with the other traceroute stats to get a complete picture of the path the packet traverses. This measurement can be initiated from both sides of the tunnel 500 to gauge any changes in routing due to asymmetric routing.

Figure 18:
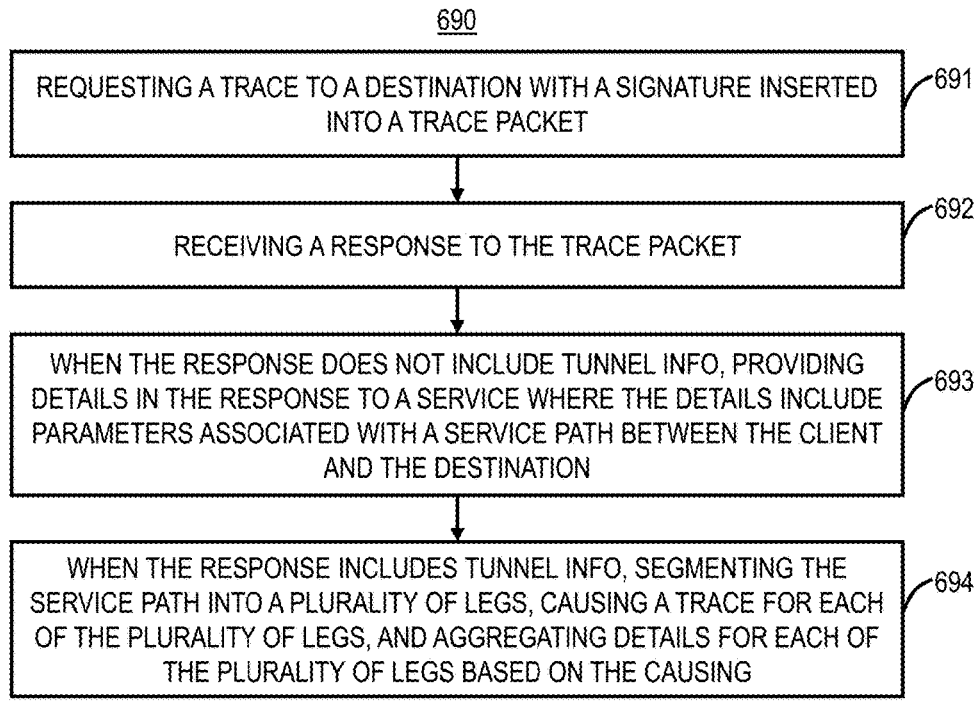
FIG. 18 is a flowchart of a process for detection of latency, packet drops, and network hops through a tunnel by tracing hops therein.

FIG. 18 is a flowchart of a process 690 for detection of latency, packet drops, and network hops through a tunnel by tracing hops therein. The process 690 is described with reference to a node associated with the tunnel 500, i.e., either the tunnel client 510, the tunnel server 520, or the egress router 630. The process 690 can be implemented as a method that includes steps, via a processing device configured to execute the steps, and via a non-transitory computer-readable medium that includes instructions that cause one or more processors to implement the steps.

The process 690 includes receiving a request for a trace of the tunnel from a client (step 691); causing the trace inside the tunnel (step 692); obtaining results of the trace inside the tunnel (step 693); and sending the results of the trace inside the tunnel to the client so that the client aggregates these details with details from one or more additional legs to provide an overall view of a service path between the client and a destination (step 694).

The inside the tunnel can include identifying a packet with a predefined signature, analyzing a Time-to-Live (TTL) value in the packet, and sending a response to a probe initiator based on the TTL value. The response can include an Internet Protocol (IP) address that was spoofed based on a router where the TTL value expired.

The trace inside the tunnel can include sending trace packets to another end of the tunnel each having increasing Time-to-Live (TTL) values. The trace packets can be sent from both ends of the tunnel to determine any changes in routing between directions.

The tunnel can include a data channel and a control channel each having different encryption. The encryption can be any of Transport Layer Security (TLS), Secure Sockets Layer (SSL), and Datagram Transport Layer Security (DTLS).

Figure 19:
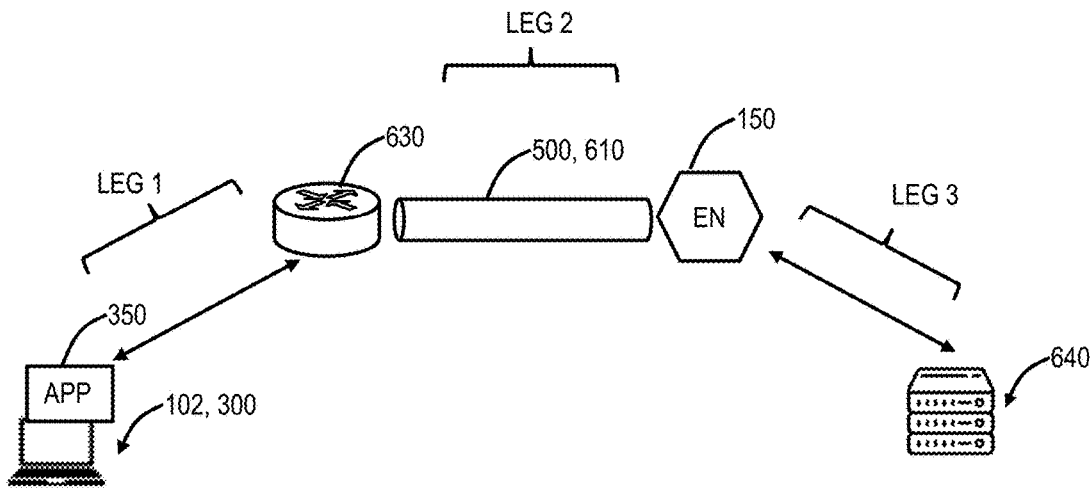
FIG. 19 is a network diagram illustrating a user connected to an enforcement node in a digital experience monitoring application.

§ 12.0 Metric Computation for Traceroute Probes Using Cached Data to Prevent a Surge on Destination Servers FIG. 19 is a network diagram illustrating a user 102 connected to an enforcement node 150 in a digital experience monitoring application. In a practical embodiment, the cloud-based system 100 with the nodes 150 as proxies can be used to perform digital experience monitoring as described herein. In such as system, there can be a lot of probes. To prevent a surge of traffic to the destination 640, the present disclosure includes a cache approach where traceroute results are cached on the proxy for a finite configurable time. For that time interval, all subsequent probe requests are served out of the cache rather than sending a new set of probes per request. While one request is pending on a destination 640, any probe that arrives for the same destination can be held in a queue and responded from the cache when the response for the first probe arrives and is cached.

Specifically, if a lot of user devices 300 with the applications 350 are independently probing the destination 640 there is a risk of throttling of the probes at the destination 640 and the hops as well as blacklisting IP addresses of the tunnel server 520 or nodes 150 used to probe the destination 640.

The enforcement node 150 is configured to probe the destination 640, i.e., the leg 3, on behalf of requesting clients. The enforcement node 150 is also configured to probe the tunnel 500, 610 as described herein, i.e., leg 2, in a reverse trace. The present disclosure contemplates the enforcement node 150 caching results from these two legs and serving subsequent requests from the cache for a predetermined amount of time. Each cache entry can include all hop IP addresses from the enforcement node 150 to the destination 640 and from the enforcement node 150 to the egress router 630, packet loss, and latency for each probe sent. Note, some clients can share both legs 2 and 3 whereas some clients may have a different leg 2 or 3. Those skilled in the art will recognize either or both can be served out of cache as required.

Figure 20:
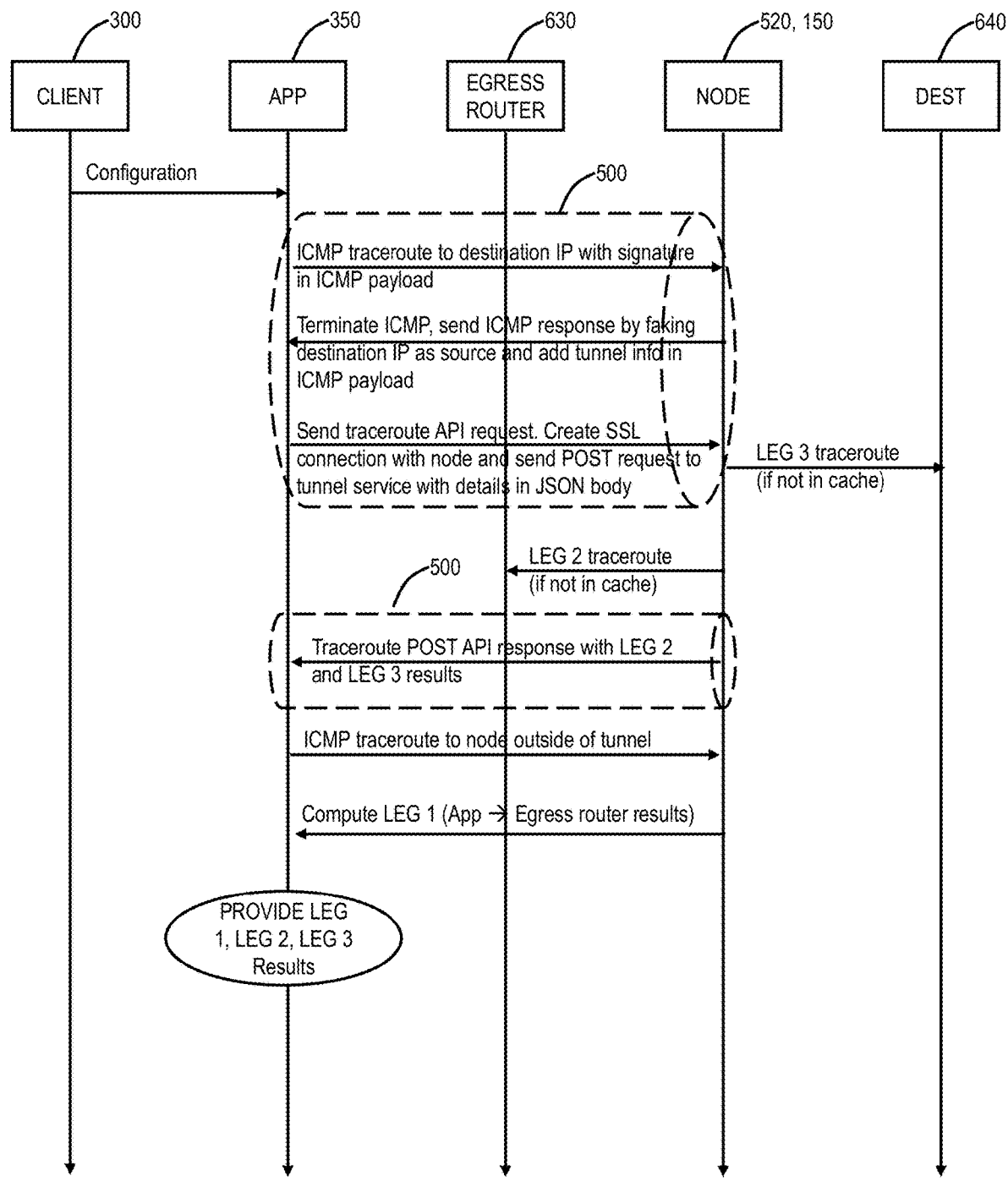
FIG. 20 is a flow diagram illustrating actions between the client (user device), the application, the egress router, the enforcement node, and the destination in an example operation of the process of FIGS. 13 and 14, along with caching of trace results at the enforcement node.

FIG. 20 is a flow diagram illustrating actions between the client (user device 300), the application 350, the egress router 630, the enforcement node 150, and the destination 640 in an example operation of the processes 650, 660, along with caching of trace results at the enforcement node 150. In this example, the application 350 is the tunnel client 510 whereas the enforcement node 150 is the tunnel server 520. The flow includes client configuration via the application 350 including the cloud tunnel 500. The application 350 can send an ICMP traceroute to the destination 640 IP address with the Signature-A in the ICMP payload. The enforcement node 150 is configured to terminate the ICMP traceroute and send an ICMP response by faking the destination IP as the source along with tunnel info in the ICMP payload. Once the application 350 is aware of the tunnel, the application 350 can send a traceroute API request, create an SSL connection with the enforcement node 150 and send a POST request to the tunnel service at the enforcement node 150 with details in a JavaScript Object Notation (JSON) body. The application 350 can send a restful MTR request to enforcement node 150 which includes the destination address and port in case of TCP/UDP MTR. It should also include the MTR type: TCP, UDP or ICMP. The various signatures can be via a Type-Length-Value (TLV) in the ICMP request and reply.

The enforcement node 150 is configured to perform the reverse trace of Leg 2 and the trace of Leg 3. The enforcement node 150 maintains the results of these two Legs 2, 3 in a cache for a predetermined amount of time, e.g., one minute or some other configurable value. If the results are not in the cache, the enforcement node 150 performs the trace, e.g., using MTR. The enforcement node 150 can combine the results which include latency, packet loss, and hop information and send this via a traceroute POST API response to the application 350.

The application 350 performs an ICMP traceroute to the enforcement node 150 outside of the tunnel 500. The application 350 can determine or compute the Leg 1 results based on subtracting the Leg 2 results from the results of this ICMP traceroute to the enforcement node 150 outside of the tunnel 500. Of course, this can be other types of traceroute.

Figure 21:
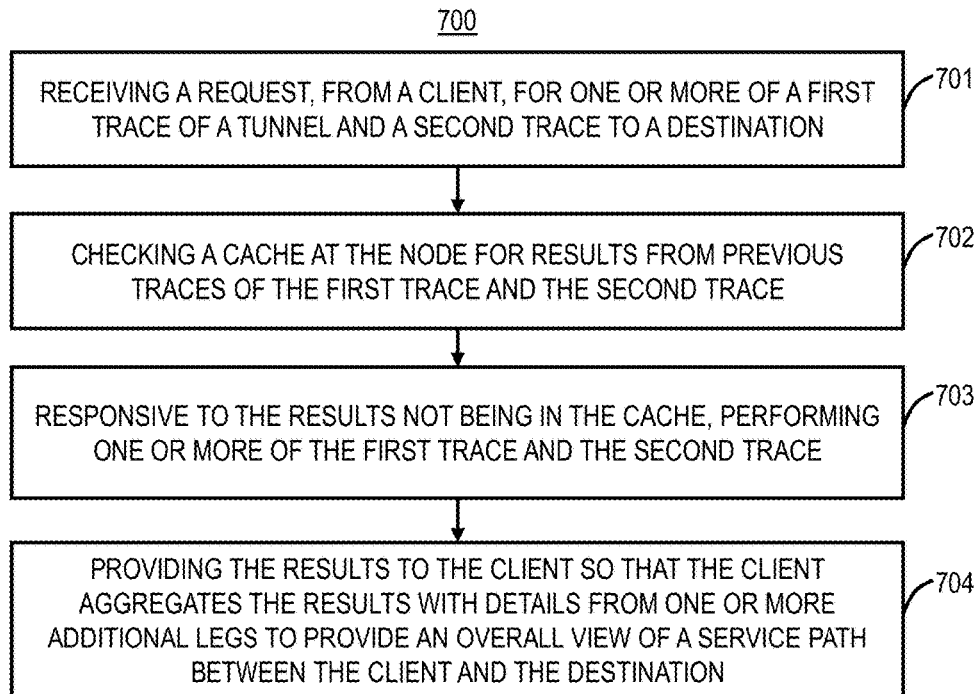
FIG. 21 is a flowchart of a process for metric computation for traceroute probes using cached data to prevent a surge on destination servers.

FIG. 21 is a flowchart of a process 700 for metric computation for traceroute probes using cached data to prevent a surge on destination servers. The process 700 is described with reference to one of the enforcement nodes 150 associated with the cloud-based system 100. The process 700 can be implemented as a method that includes steps, via the enforcement node 150 configured to execute the steps, and via a non-transitory computer-readable medium that includes instructions that cause one or more processors to implement the steps.

The process 700 includes receiving a request, from a client, for one or more of a first trace of a tunnel and a second trace to a destination (step 701); checking a cache at the node for results from previous traces of the first trace and the second trace (step 702); responsive to the results not being in the cache, performing one or more of the first trace and the second trace (step 703); and providing the results to the client so that the client aggregates the results with details from one or more additional legs to provide an overall view of a service path between the client and the destination (step 704).

The process 700 can further include, subsequent to the performing, storing corresponding results in the cache. The process 700 can further include, subsequent to a predetermined time period, removing the results from the cache. The process 700 can further include receiving a trace packet from the client outside of the tunnel; and providing a response to the trace packet, wherein the client utilizes details in the response in addition to the first trace and the second trace to determine details of the service path. The process 700 can further include receiving a trace packet to the destination from the client with a signature therein; and terminating the trace packet and responding thereto with the destination's address and with details about the tunnel. The client can connect to the destination through at least three legs. The providing can include at least one of the first trace and the second trace from the cache and the other from the performing.

§ 13.0 TCP Traceroute Using RST and SYN-ACK to Determine Destination Reachability Referring back to FIG. 11, for a description of a TCP traceroute from the client (user device 300) to the destination (node 150), the client creates a series of packets with increasing TTL values. TTL values are decremented for each hop. When each packet is received at the routers 602A-602D with the TTL value of 0, the packet is discarded, and a response is sent back to the client ("TTL Time Exceeded"). The response includes information regarding its location and indicating data transfer times. Finally, the client knows that the destination has been reached (and stops sending packets) when it receives a different message from a hop, saying that the port intended is unreachable ("Destination/Port unreachable"). In order to use TCP for tracing the path to the destination, one cannot use standard TCP stream sockets as internally TCP always retransmits packets, and, as a result, one cannot estimate the packet loss and latency sitting at the application layer. To avoid this, traceroute (aka TR) applications use raw sockets where TCP packets are framed in the application and directly injected into the network bypassing the TCP stack.

Current TCP traceroute applications/tools cannot determine if the destination has been reached as they have no ability to read the response sent by the destination. In an embodiment, the present disclosure includes determining the reachability of the destination by peeking into the response packets for a SYN-ACK or an RST sent by the destination. A reception of the SYN-ACK or RST from the destination will indicate the availability of the destination. This ability to peek into the TCP stack for a response is unique and gives the ability to use TCP as a technique to determine reachability.

ICMP and UDP TR implementations detect the destination reachability by looking at "ICMP ECHO" response and "UDP port unreachable" errors, respectively. This is relatively straightforward as the responses from the intermediate hops and the destination are at the ICMP layer which the applications can snoop and process.

TCP poses a unique challenge in that the final destination responds with either an RST or a SYN-ACK when the TCP SYN hits the destination stack. These responses generated by the destination are not ICMP responses but instead are standard TCP responses that the local TCP stacks on the originator of the request consume. So while the request packet was injected by a raw socket, the TCP RST or the SYN-ACK would land up on the TCP stack and as there is no corresponding TCP socket, the response from the destination is silently dropped believing its a stray. As a result of this, TCP traceroute applications will not be able to detect the responses from the destination thus rendering the utility with very little use as the path is always incomplete with no destination ever discovered.

To address the lack of reachability detection of the destination, the present disclosure includes a modification to the TCP stack to recognize TCP traceroute traffic and divert the RST/SYN-ACK response to appropriate "raw sockets" so that the TR application can determine the reachability to the destination. This way the TCP TR can draw the complete path with all the intermediate hops and the final destination giving the administrator a full picture of the path taken by a packet from the source to the destination. Also, the raw RST packet can be sent to the destination as well after SYN-ACK is received by a TR application so that the connection can be closed in time rather than waiting for a timeout. As described herein, a TR or traceroute application is software executed on a processing device such as the server 200 or the user device 300 for implementing a traceroute, such as using TCP traceroute. Also, TCP checksum, sequence, and ACK in the RST packet are handled by TR application itself. The source port in the SYN packet is allocated by TCP stack from the port pool based on destination IP and port to avoid collision with real user traffic.

Figure 22:
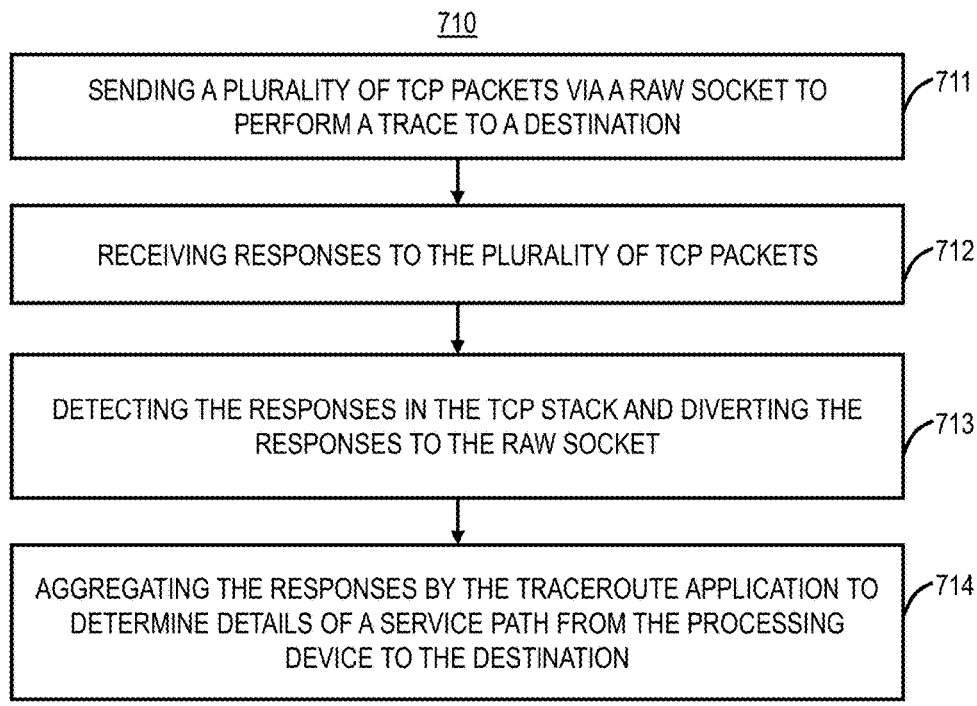
FIG. 22 is a flowchart of a process for TCP traceroute using RST and SYN-ACK to determine destination reachability.

FIG. 22 is a flowchart of a process 710 for TCP traceroute using RST and SYN-ACK to determine destination reachability. The process 710 is described with reference to one of the user device 300 with the application 350 and the enforcement nodes 150 associated with the cloud-based system 100. The process 710 can be implemented as a method that includes steps, via a processing device configured to execute the steps, and via a non-transitory computer-readable medium that includes instructions that cause one or more processors to implement the steps. The process 710 can be implemented via a traceroute application implementing a TCP stack in the processing device.

The process 710 includes sending a plurality of TCP packets via a raw socket to perform a trace to a destination (step 711); receiving responses to the plurality of TCP packets (step 712); detecting the responses in the TCP stack and diverting the responses to the raw socket (step 713); and aggregating the responses by the traceroute application to determine details of a service path from the processing device to the destination (step 714).

The plurality of TCP packets can include TCP Synchronize (SYN) messages, and the responses include TCP SYN-Acknowledgement (ACK) or Reset (RST) messages. The process 710 receiving a TCP SYN-ACK message from the destination; and sending a TCP RST packet to the destination. A TCP checksum, sequence, and ACK in the TCP RST packet can be implemented by the traceroute application. The raw socket can be used in lieu of a TCP socket. A port for the raw socket can be allocated by the TCP stack from a pool of ports based on the destination.

§ 14.0 Adaptive Probing to Discover a Protocol for Network Tracing

Traceroute implementations conventionally use just one protocol to trace the path from the source to the destination along with the hops, latency, and packet loss stats. In an embodiment, the present disclosure includes a combination of ICMP, UDP and TCP to get a more accurate measurements of hops, packet loss, and latency from source to destination. As each network entity tends to respond to a particular protocol more favorably, the present disclosure uses the protocol that would have the highest probability of getting a response. Results from using different protocols are aggregated and displayed as one. A problem with traceroute is that it relies on hosts responding with ICMP errors for TTL expiry which is unreliable due to routers either disabling this or rate limiting. Note, routers that run BGP respond to TCP port 179 while blocking ICMP.

The following utilizes the example of FIG. 19 with the three legs, namely Leg 1, Leg 2, and Leg 3. In an embodiment, a single protocol—ICMP/UDP/TCP—is used to probe all three legs. Using ICMP/UDP for Leg 3 is not advisable as the probes are primarily to check the availability of a destination 640 that is a Web app which is running on TCP ports 80/443. For example, a particular Web app can be 100% available but show a path to the destination that is broken, with the reason being that ICMP and UDP probes are blocked by the destination 640.

The present disclosure includes a dynamic probe that tries a combination of protocol types to get an estimate of packet loss and the latency to the egress/destination. Determining the intermediate hops and their latency/packet loss is a matter of luck irrespective of the protocol used as the TTL expiry is a Layer 3 property handled by routers. For practical purposes, the choice of protocol is significant inside a customer network due to Access Control List (ACL)/Firewall (FW) rules while less significant on the internet although some routers prioritize TCP traffic over the rest. The choice of protocol is the most significant when the end host receives it as the response to the probe is completely dependent on the rules configured on that host and these are all over the place.

Most destinations 640 will only respond to TCP ports 80/443. The egress routers 630 will respond to ICMP-ECHO at times and could either respond with a SYN-ACK or RST when a TCP probe is sent to port 179/80/443. There are only two entities that are guaranteed to respond and metrics to these can be trusted, and the rest are best effort. The two entities include the destination 640 responding to a TCP SYN on port 443 (assuming Web apps), and the node 150 responding to a PING or TCP SYN.

In an embodiment, the destination 640 is a SaaS endpoint running Web applications. With a TCP SYN to port 443 on the destination 640, the destination 640 is bound to respond with a true measure of reachability, latency and packet loss. Assume that this will be the IP of the load balancer fronting a server farm for the destination 640 but then that is how far the service path can be reached. It is also possible to close the connection to the server with an RST/FIN to free up any resource on the destination 640. Packet loss and latency to the destination 640 are determined by the response to the TCP SYN. One optimization to find the latency and packet loss could be to harvest the data for the domain from the web probes. But it is still necessary to send the TCP traceroute probes to determine the number of hops to the destination 640.

Figure 23:
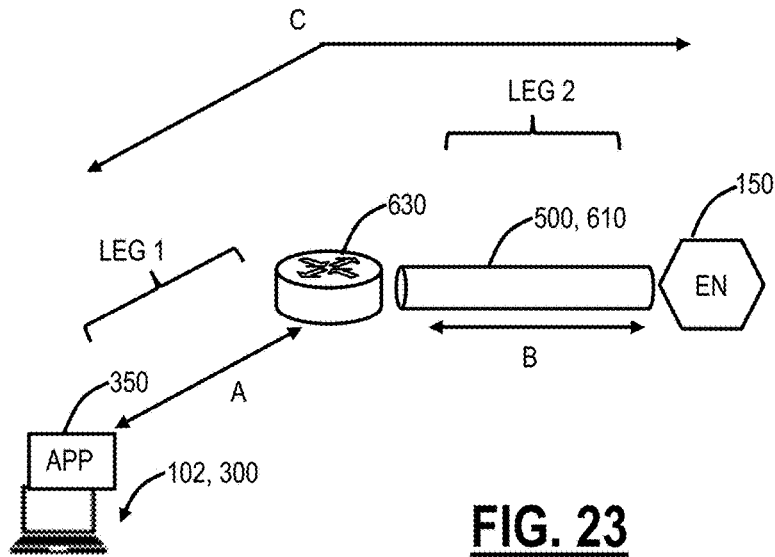
FIG. 23 is a network diagram with an excerpt of the network diagram of FIG. 19 illustrating Legs 2 and 3 for illustrating adaptive probing.

FIG. 23 is a network diagram with an excerpt of the network diagram of FIG. 19 illustrating Legs 2 and 3 for illustrating adaptive probing. In an embodiment, the egress router 630 is probed from two sides—from the application 350 and from the enforcement node 150. The approach is to first find a protocol the egress router 630 will respond to by sending a set of probes directly to the egress router 630 by setting a large TTL and then employing the regular MTR logic to trace the hops in between. This way it is known that there is a point at which the probes will get a response.

To give an example, start with ICMP-ECHO to the egress router 630 IP with TTL=64, if there is no response, then switch to TCP-SYN probes to ports 179 (Border Gateway Protocol (BGP)), 80, 443. Either an RST or an SYN-ACK will give the latency and the packet loss.

§ 14.1 Detecting Packet Loss Between the Application and the Egress Router

There are two parameters to check here—packet loss and latency. In an embodiment, once the egress router 630 IP address is determined, ICMP/UDP probes are sent towards the egress IP with the hope that it responds. The issue with this is that if the egress router 630 is configured to drop ICMP/UDP probes then it will show as unreachable.

With respect to packet loss detection, as the handling of the ICMP responses to TTL expiry are done in software and rate limited, the lack of an ICMP error response is not a measure of the packet loss at that hop. Also, the egress routers on the customer network might have ICMP turned off or rate limited. But if the packets are being forwarded by the egress router 630 then that is a good measure of its ability to handle load and also routers are rated based on their ability to forward packets which is mostly done in hardware.

The following describe techniques to gauge packet loss when the egress router 630 is configured to drop or rate limit packets.

In a first step, the approach tries to reach the egress router 630 by using ICMP followed by UDP and TCP and checks for packet loss. This does not need to be a configured number of probe, e.g., it can be three probes to see if the egress router 630 responds. Based on the response to a protocol, this is stored for future reference. For example, send three ICMP probes and wait for a response. If they all fail, then send three UDP problems, and if they all fail, then send three TCP probes.

In a second step, if the result of the first step is not 0% packet loss or an acceptable %, the second step includes trying to reach beyond the egress router 630 to get a response. The intent is to exercise the packet forwarding path of the egress router 630 versus the software handling of the packets. If the packets could be forwarded successfully, then its implied that there is no loss. A safe reference point can be the enforcement node 150 as the IP address. There are two possibilities—approach 1—use the tunnel 500, 610, or approach 2—outside the tunnel 500, 610.

In a third step, when the results of the first step and the second step are not acceptable, pick a last router in the customer's network with a private IP that is responding. The egress router 630 is the first public IP address that is encountered. For the last router, looking at the routing of packets, it is the egress router 630 with one leg in the private network and the other in the public that will move the packet out of the customer premise. There could be an independent Network Address Translation (NAT) device before the egress router 630 for NAT'ing the IP but even reaching that could be a fair approximation of the loss.

The above steps are performed by the application 350 and it can maintain a cache with the approach and the results that may be refreshed periodically, when a network change occurs, and/or when the results are not good. As TCP-SYN seems to be the best bet given the rate limiting logic for ICMP on most devices, it is possible to a firewall that might see too many SYNs going out, and caching seems the best way to avoid raising a False Alarm on the firewalls and for them making changes on the firewall to let the probes out.

§ 14.2 Detecting Packet Loss Between the Enforcement Node and the Egress Router

Note that a majority of the IT administrators disable their egress routers 630 to respond to any form of traffic destined to their IP on the Internet facing side. Based on experimentation, with ~7000 egress router IP addresses, only 39% responded. In a first approach, the packet loss can be measurement outside of the tunnel 500, 610. Here, the application 350 can send a configured number of probes (e.g., ICMP, TCP) to the enforcement node 150, e.g., 11 TCP-SYN probes with TTL=64. That is, in this first approach, the assumption is packet loss between the enforcement node 150 and the egress router 630 is the same as the packet loss between the user device 300 and the enforcement node 150. If the packet loss is zero or acceptable, this is a safe assumption.

In a second approach, the enforcement node 150 can try to direct a trace to the egress router 630. This second approach can be performed if the packet loss from the first approach is not acceptable. In an embodiment, this can include sending a set number of ICMP probes destined to the egress router IP. If the response is obtained, then ICMP works other probes can be sent to the egress router 630 to measure latency and packet loss. If the ICMP probes fail, then TCP SYN probes can be sent to port 179/80/443 hoping to get a SYN-ACK or RST. Otherwise, UDP probes are sent to the traceroute ports. Any result can be one or a combination of the first approach and the second approach.

§ 14.3 Detecting Latency from Application and Node to the Egress Router

If the egress router 630 responds, then the latency is known. The problem is when the egress router 630 does not and there is still a need to estimate the latency. When switching between the ICMP, the TCP, and the UDP probes to judge the latency to the egress, if the egress router 630 does not respond, the following is performed to infer the latency.

With reference to FIG. 23, it is possible to determine the latency from the application 350 to the node 150 as the node 150's IP responds to pings and TCP SYN. The latency from the application 350 to the egress router 630 is called 'A' and the latency from the enforcement node 150 to the egress router 630 is called 'B.' If either A or B can be measured, the other one can be derived and, as long as it is a positive value, it can be used as a fair estimate. That is C=A+B, C being the latency from the client to the enforcement node 150. In the worst case, if the egress router 630 was not reachable from either side, then take 'A' as the time it takes for the application 350 to reach the farthest router (private IP) on the Intranet. If needed, it is possible to take the time the first public IP took to respond and the time it took to reach the farthest router on the Intranet and average their times.

The reverse trace can be avoided when there is no opaque tunnel present. Here, the application 350 can trace the path from itself to the enforcement node 150 using ICMP or TCP pings. Due to the absence of the opaque tunnel, the traceroute probes from the application 350 will be able to trace its path to the enforcement node 150.

For the purpose of calculating the latency when the application 350 is not able to reach the egress router 630, it is possible to have the enforcement node 150 to PING/TCP-PING to the egress router 630 to get latency. The enforcement node 150 does not have to do the traceroute but just needs to get the Round Trip Time (RTT) to the egress router 630 so that it is possible to compute A=C−B.

§ 14.4 Comparing ICMP and TCP PING Data

It was evaluated as to whether ICMP and TCP probes take different paths on the Internet. It was determined that TCP and ICMP packets are routed along the same path on the Internet when we consider the network as an Autonomous System (AS). This was based on a 122*k* set of hops and it was found that PING and TCP probes took the same path and never deviated even once when looking at it from an ASN angle.

§ 14.5 Adaptive Probe Process

Figure 24:
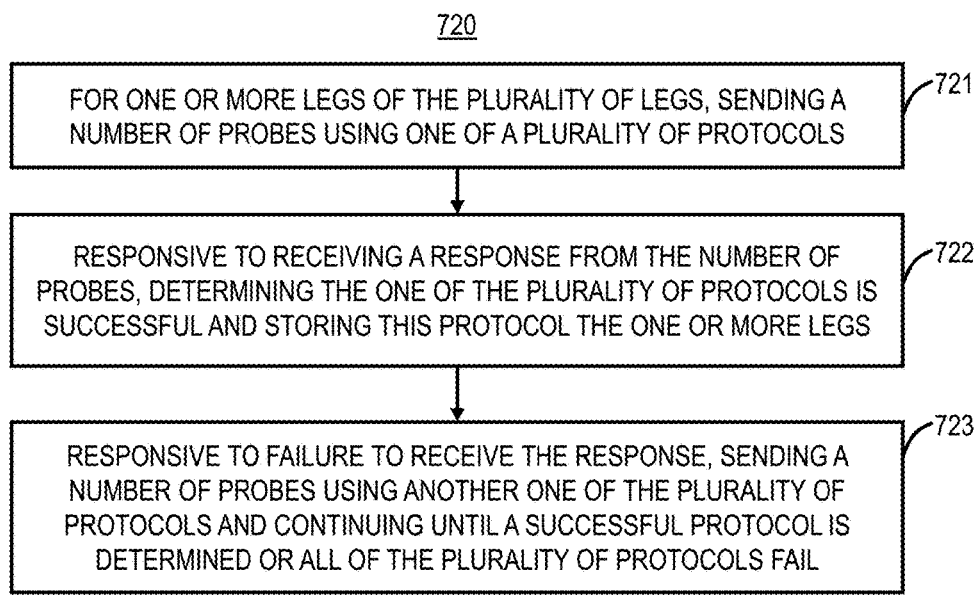
FIG. 24 is a flowchart of an adaptive probe process for traceroute probes.

FIG. 24 is a flowchart of an adaptive probe process 720 for traceroute probes. The process 720 is described with reference to one of the user device 300 with the application 350 and the enforcement nodes 150 associated with the cloud-based system 100. The process 720 can be implemented as a method that includes steps, via a processing device configured to execute the steps, and via a non-transitory computer-readable medium that includes instructions that cause one or more processors to implement the steps.

The process 720 includes, for one or more legs of the plurality of legs, sending a number of probes using one of a plurality of protocols (step 721); responsive to receiving a response from the number of probes, determining the one of the plurality of protocols is successful and storing this protocol the one or more legs (step 722); and, responsive to failure to receive the response, sending a number of probes using another one of the plurality of protocols and continuing until a successful protocol is determined or all of the plurality of protocols fail (step 723).

The plurality of protocols can include Internet Control Message Protocol (ICMP), Transmission Control Protocol (TCP), and User Datagram Protocol (UDP). The plurality of legs can include a first leg, a second leg, and a third leg. The third leg can be to a destination that includes a Web application, and wherein a protocol for the third leg includes Transmission Control Protocol (TCP). At least one of the first leg, the second leg, and the third leg can include a different protocol used thereon. Packet loss and/or latency between the first leg and the second leg can be determined based on a single trace therebetween. The process 720 can further include aggregating results for all of the plurality of legs, wherein at least two of the plurality of legs used a different protocol from one another.

§ 15.0 Accurate Differential Traceroute Latency Calculation Between Hops

Again, traceroute is a diagnostic command to find the routes (paths) and measures the latency to each hop. In traceroute, each node-to-node connection is called a hop and the latency is the round trip from the user's machine to the destination.

The conventional traceroute has limitations that it might not be complete, and the results are not accurate for the final hop as the final hop does not provide the processing delay. The traceroute results might not be complete as the final destination might not respond to the probe. The conventional traceroute does not provide the latency between the hops. Routers typically have a very fast forward path as this is done in the hardware, but some routers take significant time to respond to TTL expired messages as they do this through software.

In an embodiment, traceroute enhancements are provided that provide accurate calculations when the traffic goes through the enforcement node 150 as well as provides the latency between hops. When a customer uses the cloud-based system 100, the traffic from the user device 300 is sent through the enforcement nodes 150. The traceroute is used to provide the latency from the user device 300 to the egress router 630 as well to the enforcement node 150. If a site is bypassed in the cloud-based system 100, the traceroute measures the latency from the user device 300 to the site.

The edge connector 150A can be configured to combines this traceroute information with the information from the enforcement node 150 and provide the measurements to the user. The enforcement node 150 provides the traceroute measures from enforcement node 150 to the destination 640. Both the enforcement nodes 150 and the edge connector 150A cab support ICMP, TCP, and UDP protocols for traceroute.

When traffic is going through the enforcement node 150, the edge connector 150A can perform the traceroute using the enforcement node 150's IP address. The enforcement node 150 is configured to always respond to the traceroute probe from the edge connector 150A. This solves the incompleteness problem for the conventional traceroute that can happen in the traceroute that some destinations might not respond to the probe. If the destination 640 is bypassed in the cloud-based system 100, the edge connector 150A does traceroute the destination 640, for a best effort latency measurement to the final destination as the final destinations did not provide the processing delay. If the final destination did not respond, it provides the information for all other hops.

When the enforcement node 150 receives this probe, it responds back providing the packet processing delay in the data payload. This provides accurate absolute latency to the enforcement node 150. If the destination is bypassed in the Zscaler cloud, the Zscaler Edge connector does the best effort latency measurement to the final destination as the final destinations do not provide the processing delay.

§ 15.1 Latency Between Hops

The edge connector 150A sends a configured number of packets to hops starting with TTL 1 to the maximum configured TTL to the enforcement node 150. The hops, which are configured to respond, send the response and the edge connector 150A measures of the round-trip latency for the packet to these hops.

The edge connector 150A uses the results from all the routers 602 as well the enforcement node 150 to calculate the latency difference between hops. The edge connector 150A uses the average latency for a hop and uses that to compute adjusted averages and the difference is computed between adjusted averages.

§ 15.2 Average Latency

Figures 25, 26:
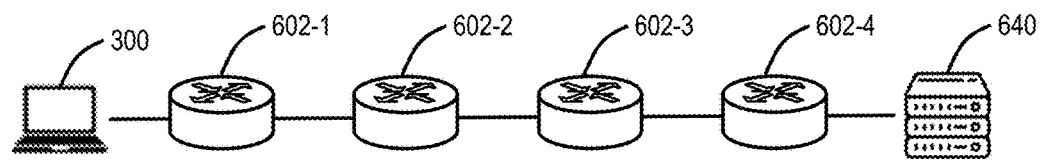
FIG. 25 is a network diagram of a network for illustrating an average latency calculation.
FIG. 26 is a diagram of the network of FIG. 25 illustrating an operation.
Figure 27:
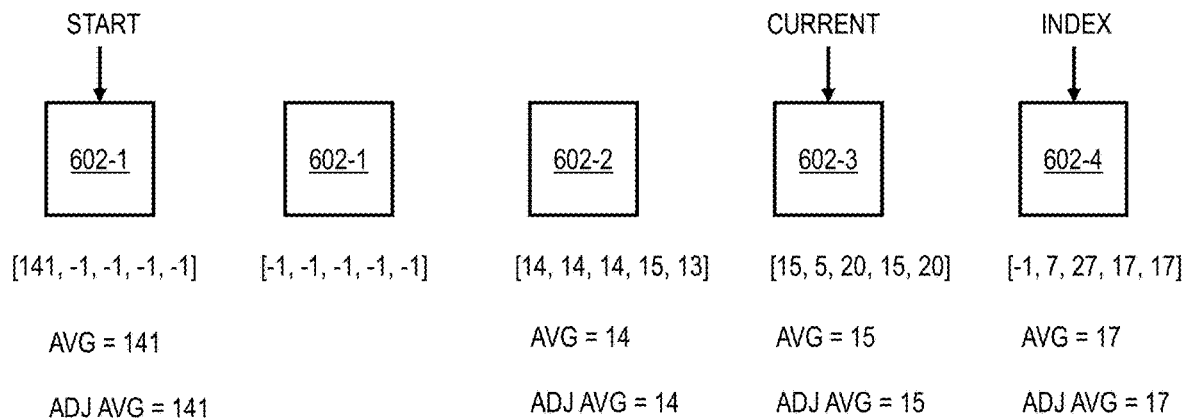
FIGS. 27-30 illustrate an example operation of the average latency adjustment.
Figure 28:
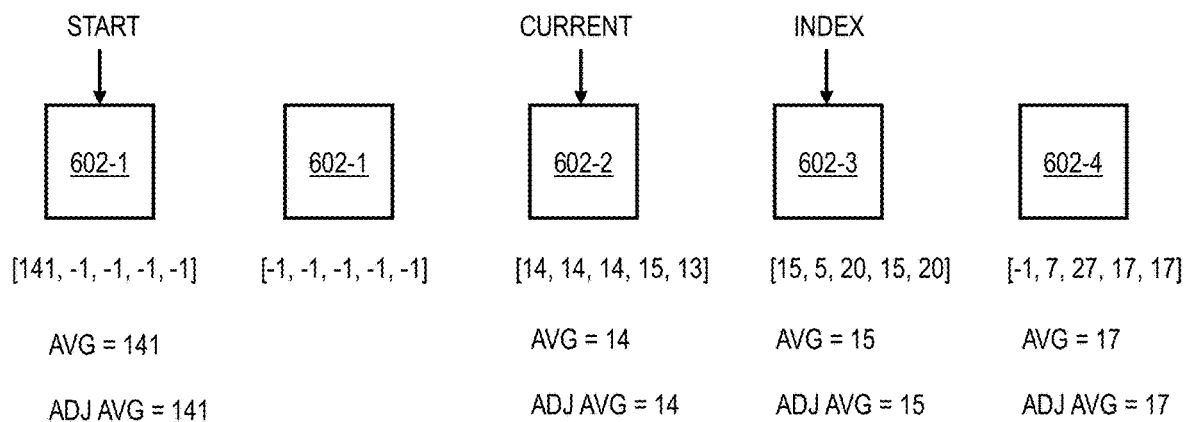
Figure 29:
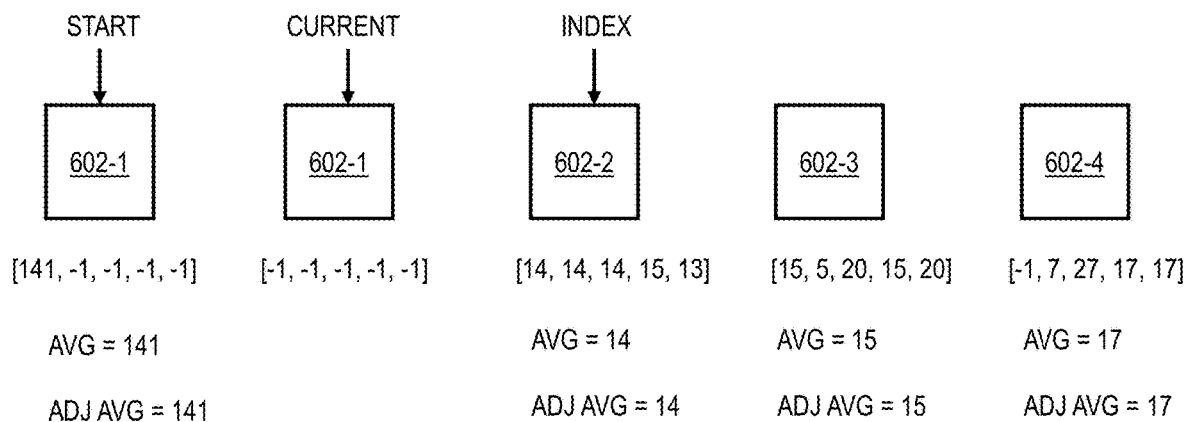
Figure 30:
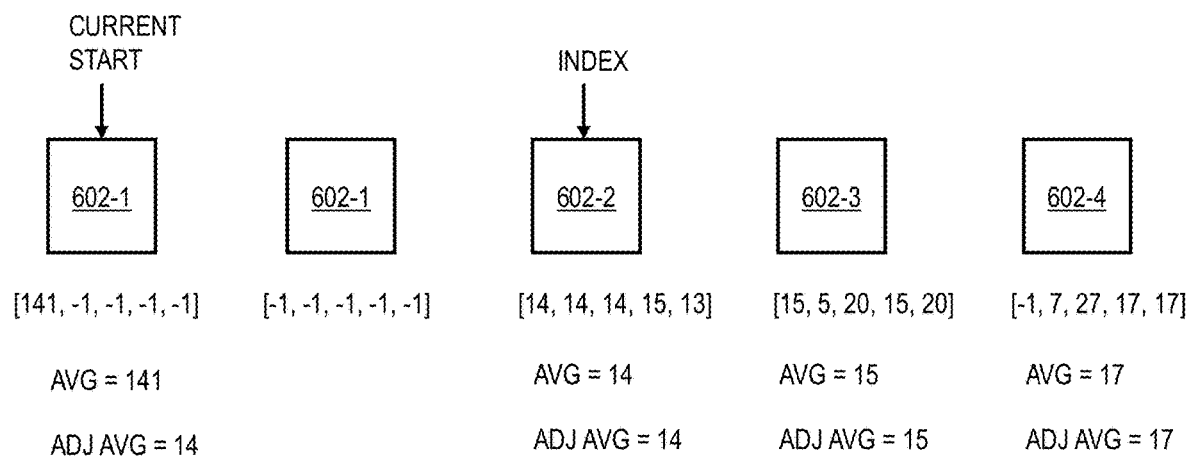
Figure 31:
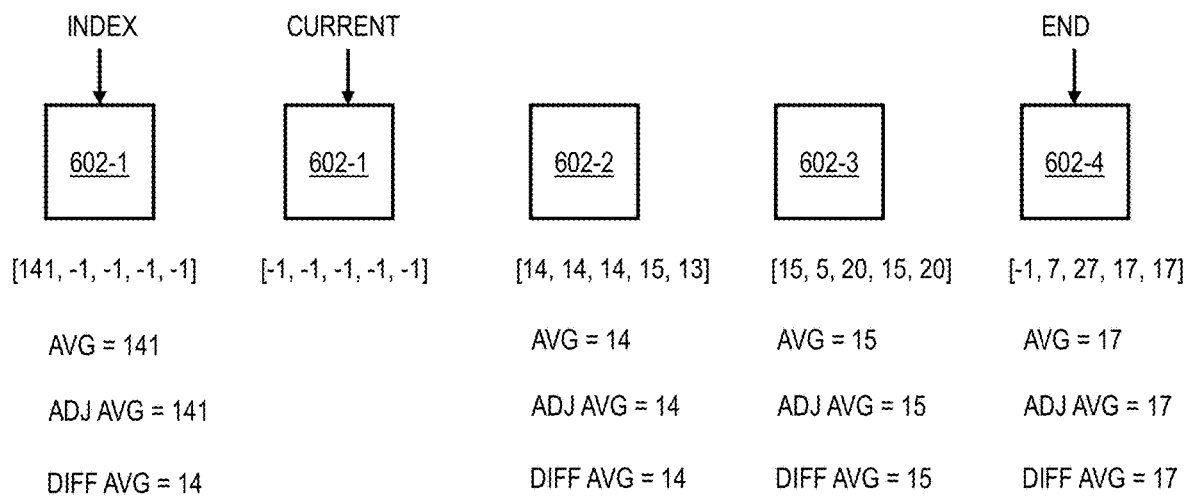
Figure 32:
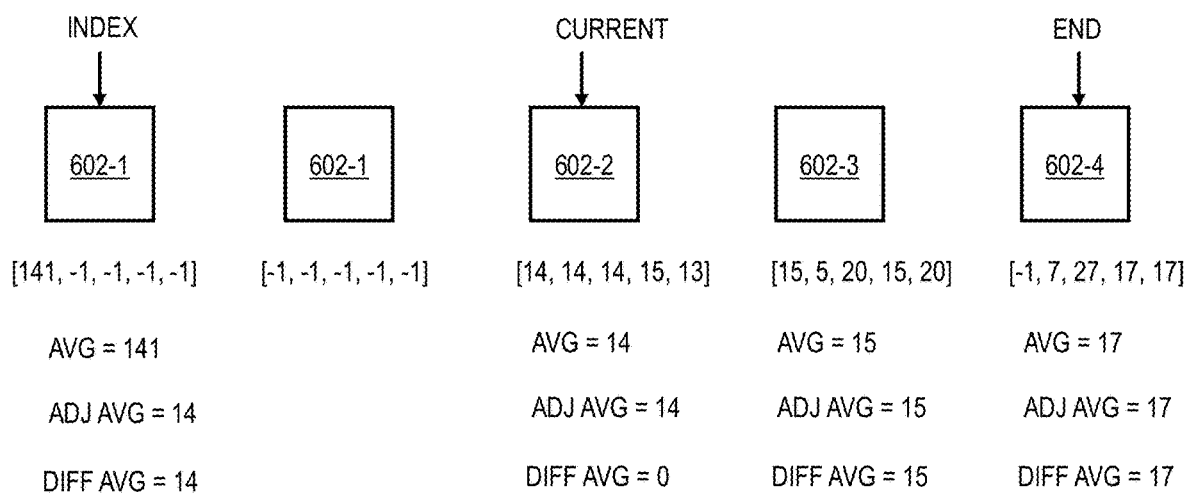

FIG. 25 is a network diagram of a network for illustrating an average latency calculation. This section describes how the average latency is calculated. In this example, there is the user device 300 connected to the destination 640 via four intermediate routers 602-1 to 602-4. FIG. 26 is a diagram of the network of FIG. 25 illustrating an operation. When a router/destination does not respond to ICMP/UDP/TCP traceroute probe, the value is recorded as −1. The average (AVG) is the sum of all positive values divided by the positive value count. If the hop is not responding, its average latency is set to 0.

The following describes how the average phase is adjusted. The average latency for each hop is copied to the adjusted average. The end is the last hop and the start is the first hop.

Step S1: Set index=end where end is the last value.
Step S2: Set current to end−1.
Step S3: If current==start−1, Go to step 9.
Step S4: If the hop at the current is not responding, set current=current−1. Go to Step S3.
Step S5: If the average latency of the current is more than the adjusted average of the index, then set the adjusted average of the current to the adjusted average of the index. If the average latency for the current is lesser than or equal to the adjusted average of the index, then do not change.
Step S6: Set index=current.
Step S7: Current=current−1.
Step S8: Go to step S3.
Step S9: Exit.

FIGS. 27-30 illustrate an example operation of the average latency adjustment.

§ 15.3 Differential Average Latency

If there is only one hop, the edge connector 150A can set the differential average to its average. The following describes a differential phase computation.

Step S11: Set index=first responding hop.
Step S12: Set current=index+1.
Step S13: If current=end+1, Go to step S19.
Step S14: If the hop at "current" is non-responding hop, set current=current+1. Go to step S13.
Step S15: Compute differential average for the hop at current=adjusted average of hop at current—adjusted average of the hop at index.

Step S16: index=current.
Step S17: current=current+1.
Step S18: Go to step 13.
Step S19: Exit.

FIGS. 31-34 illustrate an example operation of the differential average latency adjustment. This shows that average round trip latency is 14 ms from the user device 300 to router 602-1. The average latency between routers 602-1, 602-2 is <1 ms. The average latency between 602-2, 602-3 is 1 ms. The average latency between the routers 602-3, 602-4 is 2 ms.

Figure 35:
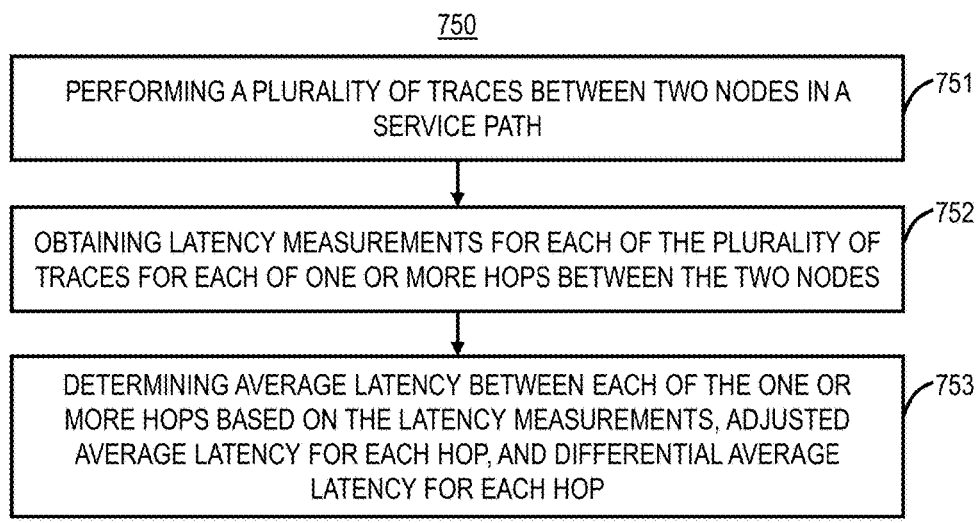
FIG. 35 is a flowchart of a process for an accurate differential traceroute latency calculation between hops.

§ 15.4 Process for Accurate Differential Traceroute Latency Calculation Between Hops FIG. 35 is a flowchart of a process 750 for an accurate differential traceroute latency calculation between hops. The process 750 is described with reference to one of the user device 300 with the application 350 and the enforcement nodes 150 associated with the cloud-based system 100. The process 750 can be implemented as a method that includes steps, via a processing device configured to execute the steps, and via a non-transitory computer-readable medium that includes instructions that cause one or more processors to implement the steps.

The process 750 includes performing a plurality of traces between two nodes in a service path (step 751); obtaining latency measurements for each of the plurality of traces for each of one or more hops between the two nodes (step 752); and determining average latency between each of the one or more hops based on the latency measurements, adjusted average latency for each hop, and differential average latency for each hop (step 753). The nodes can include two nodes in a cloud-based system. A first node is an enforcement node 150 and a second node is an edge connector 150A. The plurality of traces utilize either Internet Control Message Protocol (ICMP), Transmission Control Protocol (TCP), User Datagram Protocol (UDP), or a combination thereof. A destination of the plurality of traces can be a node in a cloud-based system.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

The foregoing sections include headers for various embodiments and those skilled in the art will appreciate these various embodiments may be used in combination with one another as well as individually. Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method implemented by a node associated with a tunnel comprising:
   receiving a request, from a client, for a trace of the tunnel;
   causing the trace inside the tunnel, the trace being caused by the node associated with the tunnel;
   obtaining, at the node associated with the tunnel, results of the trace inside the tunnel; and
   sending the results of the trace inside the tunnel to the client so that the client aggregates these details with details from one or more additional legs to provide an overall view of a service path between the client and a destination.

2. The method of claim 1, wherein the trace inside the tunnel includes
   identifying a packet with a predefined signature, analyzing a Time-to-Live (TTL) value in the packet, and sending a response to a probe initiator based on the TTL value.

3. The method of claim 2, wherein the response includes an Internet Protocol (IP) address that was spoofed based on a router where the TTL value expired.

4. The method of claim 1, wherein the trace inside the tunnel includes
   sending trace packets to another end of the tunnel each having increasing Time-to-Live (TTL) values.

5. The method of claim 4, wherein the trace packets are initiated and sent from both ends of the tunnel to determine any changes in routing between directions.

6. The method of claim 1, wherein the tunnel includes a data channel and a control channel each having different encryption.

7. The method of claim 6, wherein the encryption is any of Transport Layer Security (TLS), Secure Sockets Layer (SSL), and Datagram Transport Layer Security (DTLS).

8. A non-transitory computer-readable medium comprising instructions that, when executed, cause one or more processors associated with a node that is associated with a tunnel to perform steps of:
   receiving a request, from a client, for a trace of the tunnel;
   causing the trace inside the tunnel, the trace being caused by the node associated with the tunnel;
   obtaining, at the node associated with the tunnel, results of the trace inside the tunnel; and
   sending the results of the trace inside the tunnel to the client so that the client aggregates these details with details from one or more additional legs to provide an overall view of a service path between the client and a destination.

9. The non-transitory computer-readable medium of claim 8, wherein the trace inside the tunnel includes
   identifying a packet with a predefined signature, analyzing a Time-to-Live (TTL) value in the packet, and sending a response to a probe initiator based on the TTL value.

10. The non-transitory computer-readable medium of claim 9, wherein the response includes an Internet Protocol (IP) address that was spoofed based on a router where the TTL value expired.

11. The non-transitory computer-readable medium of claim 8, wherein the trace inside the tunnel includes
    sending trace packets to another end of the tunnel each having increasing Time-to-Live (TTL) values.

12. The non-transitory computer-readable medium of claim 11, wherein the trace packets are initiated and sent from both ends of the tunnel to determine any changes in routing between directions.

13. The non-transitory computer-readable medium of claim 8, wherein the tunnel includes a data channel and a control channel each having different encryption.

14. The non-transitory computer-readable medium of claim 13, wherein the encryption is any of Transport Layer Security (TLS), Secure Sockets Layer (SSL), and Datagram Transport Layer Security (DTLS).

15. A node associated with a tunnel comprising:
    one or more processors and memory comprising instructions that, when executed, cause the one or more processors to
    receive a request, from a client, for a trace of the tunnel;
    cause the trace inside the tunnel, the trace being caused by the node associated with the tunnel;
    obtain, at the node associated with the tunnel, results of the trace inside the tunnel; and
    send the results of the trace inside the tunnel to the client so that the client aggregates these details with details from one or more additional legs to provide an overall view of a service path between the client and a destination.

16. The node of claim 15, wherein the trace inside the tunnel includes
    identifying a packet with a predefined signature, analyzing a Time-to-Live (TTL) value in the packet, and sending a response to a probe initiator based on the TTL value.

17. The node of claim 16, wherein the response includes an Internet Protocol (IP) address that was spoofed based on a router where the TTL value expired.

18. The node of claim 15, wherein the trace inside the tunnel includes sending trace packets to another end of the tunnel each having increasing Time-to-Live (TTL) values.

19. The node of claim 18, wherein the trace packets are initiated and sent from both ends of the tunnel to determine any changes in routing between directions.

20. The node of claim 15, wherein the tunnel includes a data channel and a control channel each having different encryption.

* * * * *